(12) United States Patent
Marquez et al.

(10) Patent No.: US 10,229,667 B2
(45) Date of Patent: Mar. 12, 2019

(54) MULTI-DIRECTIONAL BEAMFORMING DEVICE FOR ACQUIRING AND PROCESSING AUDIBLE INPUT

(71) Applicant: Logitech Europe S.A., Lausanne (CH)

(72) Inventors: Daniel Ryan Marquez, Vancouver, WA (US); Douglas George Morton, Vancouver, WA (US); Matthew James Green, Vancouver, WA (US)

(73) Assignee: LOGITECH EUROPE S.A., Lausanne (CH)

( * ) Notice: Subject to any disclaimer, the term of this patent is extended or adjusted under 35 U.S.C. 154(b) by 40 days.

(21) Appl. No.: 15/650,614

(22) Filed: Jul. 14, 2017

(65) Prior Publication Data

US 2018/0226065 A1 Aug. 9, 2018

Related U.S. Application Data

(60) Provisional application No. 62/456,632, filed on Feb. 8, 2017.

(51) Int. Cl.
*H04R 1/00* (2006.01)
*G10K 11/178* (2006.01)
(Continued)

(52) U.S. Cl.
CPC .......... *G10K 11/178* (2013.01); *G10K 11/346* (2013.01); *G10L 21/0208* (2013.01);
(Continued)

(58) Field of Classification Search
CPC .. H04R 3/005; H04R 2410/01; H04R 29/005; H04R 1/406; H04R 2430/23;
(Continued)

(56) References Cited

U.S. PATENT DOCUMENTS 7,106,876 B2    9/2006   Santiago
7,415,117 B2 *   8/2008   Tashev .................. H04R 3/005
                                             367/119

(Continued)

OTHER PUBLICATIONS

John Eargle, "The Microphone Book", Second Edition. 2004. 43 pages.

(Continued)

*Primary Examiner* — Matthew A Eason
(74) *Attorney, Agent, or Firm* — Patterson & Sheridan, LLP

(57) ABSTRACT

Embodiments of the disclosure generally include a method and apparatus for receiving and separating unwanted external noise from an audible input received from an audible source using an audible signal processing system that contains a plurality of audible signal sensing devices that are arranged and configured to detect an audible signal that is received from any position or angle within three dimensional space. The audible signal processing system is configured to analyze the received audible signals using a first signal processing technique that is able to separate unwanted low frequency range noise from the received audible signal and a second signal processing technique that is able to separate unwanted higher frequency range noise from the received audible signal. The audible signal processing system can then combine the signals processed by the first and second signal processing techniques to form a desired audible signal that has a high signal-to-noise ratio throughout the full speech range.

23 Claims, 18 Drawing Sheets

(51) Int. Cl.
*G10K 11/34* (2006.01)
*H04R 3/00* (2006.01)
*G10L 21/0208* (2013.01)
*G10L 15/00* (2013.01)
*G10L 25/78* (2013.01)
*G10L 21/0216* (2013.01)

(52) U.S. Cl.
CPC ..... *H04R 3/005* (2013.01); *G10K 2210/3023* (2013.01); *G10K 2210/3046* (2013.01); *G10L 15/00* (2013.01); *G10L 25/78* (2013.01); *G10L 2021/02166* (2013.01)

(58) Field of Classification Search
CPC . H04R 25/407; H04R 2201/405; G10L 15/00; G10L 2021/02166
See application file for complete search history.

(56) References Cited

U.S. PATENT DOCUMENTS

| | | | |
|---|---|---|---|
| 8,046,219 B2 | 10/2011 | Zurek et al. | |
| 8,054,990 B2 | 11/2011 | Gratke et al. | |
| 8,861,756 B2 | 10/2014 | Zhu et al. | |
| 9,111,522 B1 | 8/2015 | Worley, III | |
| 9,274,744 B2 | 3/2016 | Hart et al. | |
| 9,294,860 B1 | 3/2016 | Carlson | |
| 9,336,767 B1 | 5/2016 | Barton et al. | |
| 9,396,731 B2 | 7/2016 | Herre et al. | |
| 9,430,931 B1 | 8/2016 | Liu et al. | |
| 9,432,769 B1 | 8/2016 | Sundaram et al. | |
| 9,456,276 B1 | 9/2016 | Chhetri | |
| 9,484,030 B1 | 11/2016 | Meaney et al. | |
| 9,516,241 B2 | 12/2016 | Kim et al. | |
| 9,521,486 B1 | 12/2016 | Barton | |
| 9,542,947 B2 | 1/2017 | Schuster et al. | |
| 9,560,441 B1 | 1/2017 | McDonough, Jr. et al. | |
| 9,560,451 B2 | 1/2017 | Eichfeld et al. | |
| 9,570,071 B1 | 2/2017 | Hart et al. | |
| 9,584,642 B2 | 2/2017 | Kadiwala et al. | |
| 9,591,404 B1 | 3/2017 | Chhetri | |
| 9,900,688 B2 * | 2/2018 | Wang | G04G 21/06 |
| 9,980,042 B1 * | 5/2018 | Benattar | H04R 25/407 |
| 9,984,675 B2 * | 5/2018 | Schuster | G10L 15/00 |
| 2003/0072456 A1 * | 4/2003 | Graunnann | G01S 5/18 381/66 |
| 2005/0131299 A1 * | 6/2005 | Robinson | G01S 7/52077 600/447 |
| 2006/0245601 A1 * | 11/2006 | Michaud | G01S 5/22 381/92 |
| 2009/0106021 A1 | 4/2009 | Zurek et al. | |
| 2010/0014690 A1 | 1/2010 | Wolff et al. | |
| 2011/0274291 A1 | 11/2011 | Tashev et al. | |
| 2012/0327115 A1 | 12/2012 | Chhetri et al. | |
| 2013/0315402 A1 | 11/2013 | Visser et al. | |
| 2014/0270202 A1 | 9/2014 | Ivanov et al. | |
| 2014/0270217 A1 | 9/2014 | Ivanov et al. | |
| 2014/0270248 A1 | 9/2014 | Ivanov et al. | |
| 2014/0278394 A1 | 9/2014 | Bastyr et al. | |
| 2014/0350926 A1 | 11/2014 | Schuster et al. | |
| 2014/0350935 A1 | 11/2014 | Schuster et al. | |
| 2015/0095026 A1 | 4/2015 | Bisani et al. | |
| 2016/0094910 A1 | 3/2016 | Vallabhan et al. | |
| 2016/0173978 A1 | 6/2016 | Li et al. | |
| 2016/0241955 A1 | 8/2016 | Thyssen et al. | |
| 2017/0040710 A1 | 2/2017 | Woollen | |
| 2017/0061953 A1 | 3/2017 | An et al. | |
| 2017/0070814 A1 | 3/2017 | Lu et al. | |
| 2018/0226086 A1 * | 8/2018 | Huang | H04R 1/406 |

OTHER PUBLICATIONS

InvenSense. Microphone Array Beamforming. AN-1140. 2013, pp. 1-12.

Delay Sum Beamforming. The Lab Book pp. 1-6 (http://www.labbookpages.co.uk/audio/beamforming/delaySum.html).

* cited by examiner

MULTI-DIRECTIONAL BEAMFORMING DEVICE FOR ACQUIRING AND PROCESSING AUDIBLE INPUT

CROSS-REFERENCE TO RELATED APPLICATIONS

This application claims the benefit of U.S. provisional patent application Ser. No. 62/456,632, filed Feb. 8, 2017, which is herein incorporated by reference.

BACKGROUND OF THE INVENTION

Field of the Invention

Embodiments of the present disclosure relate to a method and apparatus for processing an audible signal to form a processed audible signal that has an improved signal-to-noise ratio.

Description of the Related Art

The popularity and reliance on electronic devices has increased dramatically in the past decade. The popularity of electronic devices, such as smart phones, touch pads, PDAs, portable computers, and portable music players, has increased in the past decade. Videotelephony and video conferencing devices have also become more popular in recent years, thanks in large part to proliferation of high speed Internet and price reductions in the supporting equipment. As the number of electronic devices and the reliance on these electronic devices has increased, there has been a desire for these devices to receive and process an audible input signal received from a user so that the audible input can be used to enable some desired task to be performed.

For years there has been a desire to construct machines that can recognize, process and/or transmit various types of audible inputs received from a human being. Although in recent years this goal has begun to be realized, currently available systems have not been able to produce results that are able to accurately detect these received audible inputs in environments where external noise is common or not well controlled. In most conventional microphone containing devices that are configured to recognize and/or process various types of audible inputs, it is often hard for the audible input processing electronics (e.g., voice recognition hardware) to clearly separate the desired human speech from the unwanted noise. This inability to separate audible inputs from the surrounding noise within the environment is primarily due to difficulties that are involved in extracting and identifying the individual sounds that make up the human speech. These difficulties are exacerbated in noisy environments. Simplistically, speech may be considered as a sequence of sounds taken from basic sounds called "phonemes," produced by a human. One or more phonemes represent a word or a phrase. Thus, extraction of the particular phonemes contained within the received speech is necessary to achieve voice recognition, which is often extremely difficult in noisy environments.

Moreover, conventional voice or speech recognition hardware are typically limited to detecting speech within the lower end of the speech frequency range, such as between about 100 hertz (Hz) and about 3,000 Hz, due to limitations in the device's sampling frequency and the geometry of the microphone assemblies. Thus, a large amount of useful data is lost by these conventional designs since they are not able to detect speech throughout the full speech range which extends between 100 Hz and about 8,000 Hz, and thus lose the information found in the higher end of the speech range found between 3,000 Hz and 8,000 Hz.

As the popularity of voice recognition systems increases, many users utilize them in a variety of environments. Use of these various devices is common in a myriad of moderately noisy to excessively noisy environments such as an office, conference room, airport, or restaurants. Several conventional methods for performing noise reduction already exist, however, many conventional methods can be categorized as types of filtering. In the related art, speech and noise are acquired in the same input channel, where they reside in the same frequency band and may have similar correlation properties. Consequently, filtering will inevitably have an effect on both the speech signal and the background noise signal. Distinguishing between voice and background noise signals is a challenging task. Speech components, which are received by conventional electronic devices, may be perceived as noise components and may be suppressed or filtered along with the noise components. While voice recognition technology is increasingly sophisticated, a clear separation of the voice component of an audio signal from noise components, or in other words having a high signal-to-noise ratio (SNR), is required for acceptable levels of accuracy in the voice recognition or even, in some cases, the delivery and reproduction of the received audio signal at a distant location.

Additionally, as the number of electronic devices and the reliance on these electronic devices has increased, there has been a desire for electronic devices that are untethered to conventional wall outlet types of power sources, thus allowing these untethered electronic devices to be portable. However, the power supply in portable electronic devices is commonly limited by a finite energy storage capacity provided by a battery. The rate of energy consumption by the device determines the time of operation of the device until the battery needs to be recharged or replaced. Therefore, it is desirable to find ways to reduce the power consumption used by the portable device's electronic components, such as voice recognition elements, to improve the battery lifetime of the portable electronic devices.

Therefore, there is a need for an electronic device that solves the problems described above. Moreover, there is a need for a portable electronic device that is able to efficiently filter out unwanted noise from an audible input that is received from an audible source.

SUMMARY OF THE INVENTION

Embodiments of the disclosure generally include a method and apparatus for receiving and separating unwanted external noise from an audible input received from an audible source. Embodiments of the disclosure may include an audible signal processing system that contains a plurality of audible signal sensing devices (e.g., microphones) that are arranged and configured to detect an audible signal that is generated and provided to the audible signal processing system from any position or angle within three dimensional (3-D) space.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1A:
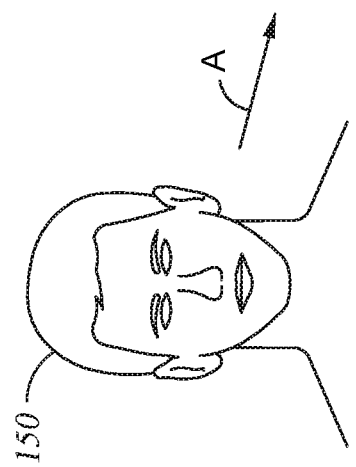
FIG. 1A is a schematic diagram illustrating an example of an audible signal processing system, according to one or more embodiments of the present disclosure.
Figure 1A:
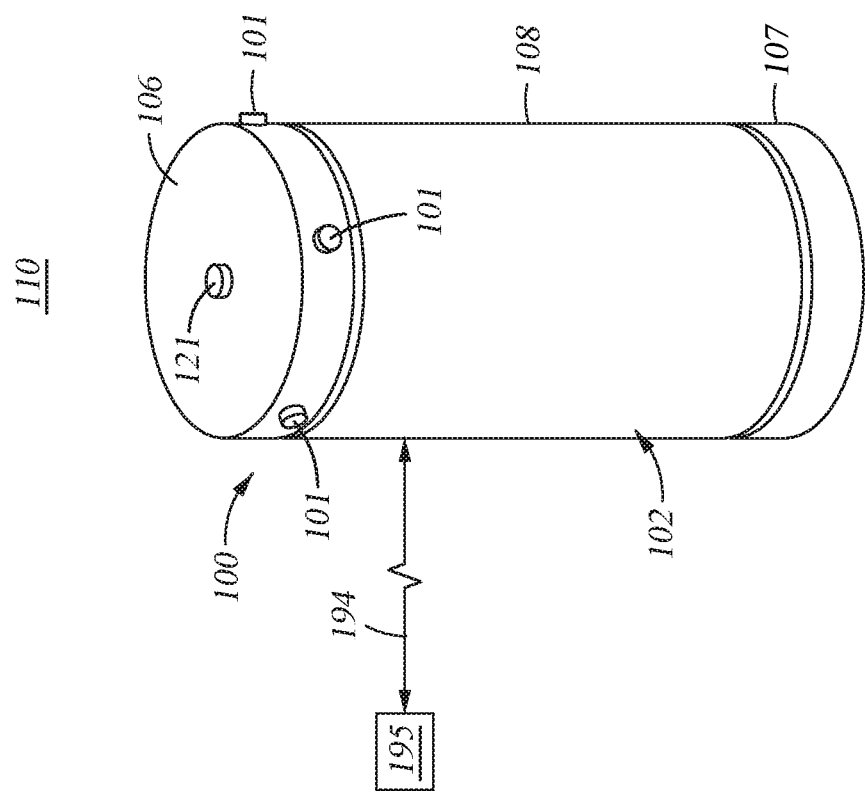

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring one or more of the embodiments of the present disclosure.

Embodiments of the disclosure generally include a method and apparatus for receiving and separating unwanted external noise from an audible input received from an audible source. Embodiments of the disclosure may include an audible signal processing system that contains a plurality of audible signal sensing devices (e.g., microphones) that are arranged and configured to detect an audible signal that is generated and provided to the audible signal processing system from any position or angle within three dimensional (3-D) space. The audible signal processing system is configured to analyze the audible signals received by each of the plurality of audible signal sensing devices using a first signal processing technique that is able to separate unwanted low frequency range noise from the detected audible signals and a second signal processing technique that is able to separate unwanted higher frequency range noise from the detected audible signals. The audible signal processing system is then configured to combine the signals processed by the first and second signal processing techniques to form a desired audible signal that has a high signal-to-noise ratio throughout a desired frequency range, such as the full speech range.

In some configurations, the audible signal processing system is designed to be portable and thus run on a power source that has a finite amount energy stored therein (e.g., battery). Therefore, in some cases the audible signal processing system may be further configured to receive and separate the unwanted external noise from a received audible input in an efficient manner to extend the operation time of the portable audible signal processing system. The audible signal processing system may also be configured to receive an audible signal from an external source, efficiently remove or separate unwanted noise from the received audible signal, and then deliver the processed audible signal to a software application that is configured to further process and/or perform some desired activity based on the processed audible signal. The audible signal processing system may also be configured to deliver the processed audible signal to another electronic device that is configured to receive and process the received information so that the second device can perform some desired activity.

Figure 1B:
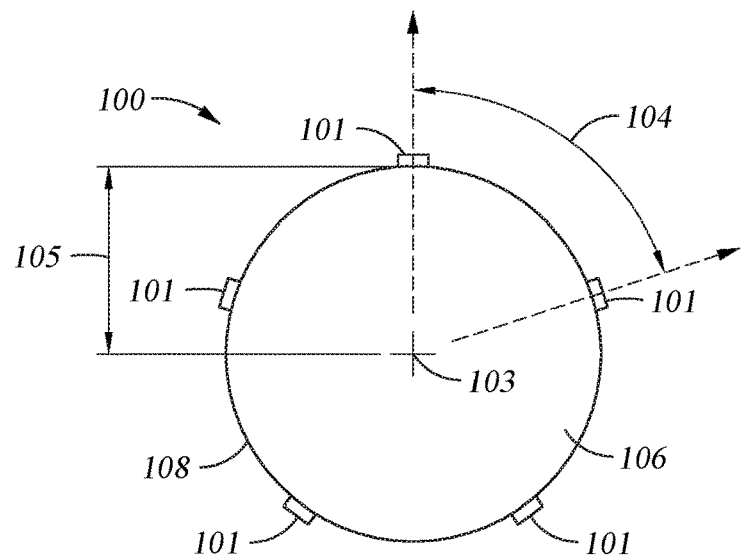
FIG. 1B is a plan view of the audible signal processing system shown in FIG. 1A without a center microphone shown, according to one or more embodiments of the present disclosure.

FIG. 1A is a schematic diagram illustrating an example of an audible signal processing system 100, according to one or more embodiments of the present disclosure. FIG. 1B is a diagram illustrating a plan view of the audible signal processing system 100 shown in FIG. 1A. The audible signal processing system 100 will generally include an electronic device 102. The electronic device 102 can be a computing device that can be used as a standalone electronic device or an electronic device that can be used in combination with other electronic devices. In one example, as shown in FIG. 1A, the electronic device 102 is able to communicate with a separate second electronic device 195 over a wired or wireless communication link 194. Alternately, in another example, the electronic device 102 is a component within the second electronic device 195. In either case, the electronic device 102 and/or the second electronic device 195 may be a wireless speaker, video camera device that includes a CCD camera, a keyboard, smart phone, a speaker phone, home automation device, or other useful electronic device. In one example, the electronic device 102 or the second electronic device 195 may be an Ultimate Ears Boom™ speaker, a Harmony™ universal remote control or a Logitech Connect™ or a Logitech BCC 950™ video conferencing device that are all available from Logitech USA of Newark Calif. or Logitech Europe S.A of Lausanne, Switzerland. The electronic device 102 or the second electronic device 195 may also be an iPod®, iPhone®, iPad®, Android™ phone, Samsung Galaxy®, Squeeze™ box, Microsoft Surface®, laptop or other similar device. While the discussion below primarily describes or provides examples of an audible signal processing system 100 that is a standalone portable electronic device this configuration is not intended to be limiting as to the scope of the disclosure provided herein.

The electronic device 102 will include a plurality of audible signal detection devices that are positioned in a geometrical array across one or more surfaces of the electronic device 102. In some embodiments, the geometrical array of audible signal detection devices, or hereafter referred to as microphones 101, can be positioned in a two dimensional (2-D) array of microphones 101 or a three dimensional (3-D) array of microphones, which may include microphones 101 and one or more microphones 121. The electronic device 102 may be any desirable shape, such as the cylindrical shape shown in FIG. 1A, and may include one or more exterior surfaces on which one or more of the microphones 101, 121 may be positioned, such as a top surface 106, a side surface 108 and a supporting surface 107. The supporting surface 107 is a surface on which the whole electronic device 102 may be positioned during normal operation. Also, while FIGS. 1A-1B, 2A, 5A-5B, and 6D illustrate the microphones 101, 121 being positioned on or extending from a surface of the electronic device 102, this configuration is not intended to be limiting as to the scope of the disclosure provided herein since the microphones 101, 121 could also be positioned so that the exterior surface of the microphones are flush with or recessed from the surface on which they are disposed. While, for simplicity of discussion reasons, the disclosure below primarily includes a discussion relating to a geometrical array that includes a two dimensional (2-D) array of microphones this configuration is not intended to be limiting as to the scope of the disclosure provided herein since three dimensional (3-D) microphone arrays can also be used with one or more of the embodiments disclosed herein. A geometrical array of microphones may include at least three microphones, or, for example, five microphones 101, as shown in FIG. 1B, or even seven microphones as shown in FIG. 6D. However, in some cases it may be desirable to have only two microphones 101. The microphones 101 can be any type of electrical device that is able to convert air pressure variations of a sound wave into an electrical signal, and thus may include, but are not limited to a dynamic microphone, condenser microphone, piezoelectric microphone, fiber optic microphone, ribbon microphone, MEMS microphone or other similar device. In some embodiments, the microphones 101 are omnidirectional microphones that are able to detect audible signals from all directions.

In some embodiments, the microphones 101 are positioned in a two-dimensional (2-D) geometrical array across the top surface 106 and/or side surface 108 of the electronic device 102. In one example, as shown in FIGS. 1A and 1B, the geometrical array of microphones 101 are evenly distributed across the side surface 108. As illustrated in FIG. 1B, five microphones 101 within the geometrical array are evenly distributed in a circular array across the side surface 108 so that each microphone 101 is positioned a distance 105 from a center point 103 and are at an equal angular distance 104 apart (e.g., 72° apart). In general, the microphones 101 within the electronic device 102 are positioned so that all of the microphones 101 are positioned in a geometrical array (e.g., 2-D array or 3-D array) so that the electronic device 102 can better detect audible signals arriving from any direction and prevent aliasing of the detected direction of the received audible signal data that is common in conventional linear microphone configurations. Thus, the electronic device 102 is able to receive an audible signal "A" provided from an audible source 150 that is positioned a distance in three dimensional space from the audible signal processing system 100 and then process the received audible signals so that other unwanted audible signals that were provided from other sources that are positioned at different positions relative to the audible signal processing system 100 can be preferentially excluded.

Figure 1C:
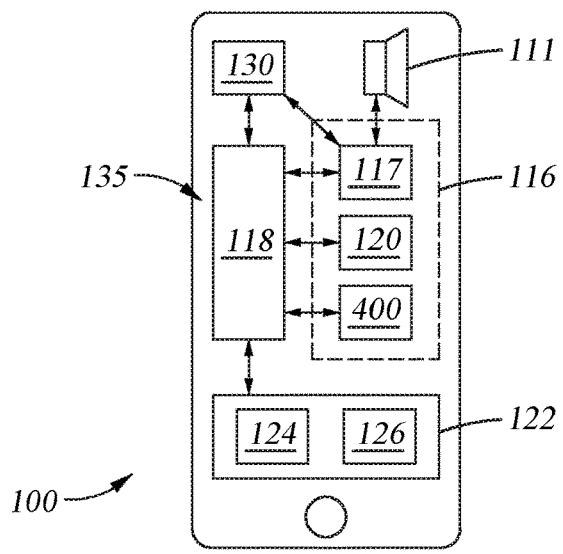
FIG. 1C is a schematic block diagram of device components found within the audible signal processing system shown in FIG. 1A, according to one or more embodiments of the present disclosure.

FIG. 1C is a schematic diagram illustrating an electronic assembly 135 within the audible signal processing system 100, according to one embodiment of the present disclosure. In general, the electronic assembly 135 will include a processor 118, non-volatile memory 122, power source 130 and an audible signal processing device 400. During operation, the electronic device 102 is configured to receive a plurality of audible signals, which include an audible signal "A", from a plurality of microphones 101. The audible signal processing device 400 and processor 118 then receive the detected audible signals from each of the microphones 101 and processes the detected inputs to remove or separate the unwanted external noise from the desired audible signal. The processed audible signal can then be used to perform some additional task by the audible signal processing system 100 or other downstream device.

The audible signal processing device 400 generally includes electrical components that can efficiently separate a desired portion on an audible signal from other received noise using a low frequency signal processing technique and a higher frequency signal processing technique. It is believed that the processes performed by the audible signal processing device 400 will reduce the error rate encountered when using the processed audible signal in a subsequent voice detection, voice communication, voice activated electronic device control and/or voice recognition process versus processed audible signals generated by conventional noise cancelling or noise reduction techniques that are common today. The processes described herein are also adapted to extend the operation time of the audible signal processing system 100 before a recharge or replacement of the power source 130 is required. While the power source 130 described herein may include a battery, the electronic device 102 may at one time or another receive power from a wired connection to a wall outlet, wireless charger or other similar devices without deviating from the basic scope of the disclosure provided herein.

The electronic assembly 135 may include the processor 118 that is coupled to input/output (I/O) devices 116, the power source 130, and the non-volatile memory unit 122. Memory unit 122 may include one or more software applications 124, such as the controlling software program which is described further below. The memory unit 122 may also include stored media data 126 that is used by the processor 118 to perform various parts of the methods described herein. The processor 118 may be a hardware unit or combination of hardware units capable of executing software applications and processing data. In some configurations, the processor 118 includes a central processing unit (CPU), a digital signal processor (DSP), an application-specific integrated circuit (ASIC), and/or a combination of such units. The processor 118 is generally configured to execute the one or more software applications 124 and process the stored media data 126, which may be each included within the memory unit 122.

The I/O devices 116 are coupled to memory unit 122 and processor 118, and may include devices capable of receiving input and/or devices capable of providing output. The I/O devices 116 include the audio processing device 117 which receives the battery power and an input signal 104, and produces the output signal 106 which may be received and then broadcast by the speaker system 111. The I/O devices 116 also include one or more wireless transceivers 120 that are configured to establish one or more different types of wired or wireless communication links with other transceivers residing within other computing devices. A given transceiver within the I/O devices 116 could establish, for example, a Wi-Fi communication link, near field communication (NFC) link or a Bluetooth® communication link (e.g., BTLE, Bluetooth classic), among other types of communication links with similar components in the second electronic device 195.

The memory unit 122 may be any technically feasible type of hardware unit configured to store data. For example, the memory unit 122 could be a hard disk, a random access memory (RAM) module, a flash memory unit, or a combination of different hardware units configured to store data. The software application 124, which is stored within the memory unit 122, includes program code that may be executed by processor 118 in order to perform various functionalities associated with the electronic device 102. The stored media data 126 may include any type of information that relates to a desired control parameter, quasi-direction information, calculated time delay information, noise signal RMS information, user data, electronic device configuration data, device control rules or other useful information, which are discussed further below. The stored media data 126 may include information that is delivered to and/or received from the source 150 or another electronic device, such as the second electronic device 195. The stored media data 126 may reflect various data files, settings and/or parameters associated with the environment, audible signal processing device control and/or desired behavior of the electronic device 102.

As discussed above, during operation the electronic device 102 is configured to detect an audible signal "A" (e.g., voice command, acoustic signal) by use of a plurality of microphones 101 and then process received audible signals using the audible signal processing device 400 so that the processed audible signals can be used to perform some desired task, or audible signal processing activity, by the audible signal processing system 100 or other electronic device, such as voice recognition, voice communication, voice activated electronic device control and/or other useful audible signal enabled task or activity. However, depending on the position of the audible source 150 relative to the microphones 101 within the electronic device 102 there will be a delay in the time when each microphone receives the same audible signal. In general, voice communication techniques will include any type of two-way communication process such as an audio chat, video chat, voice call or other similar communication technique.

Figure 2A:
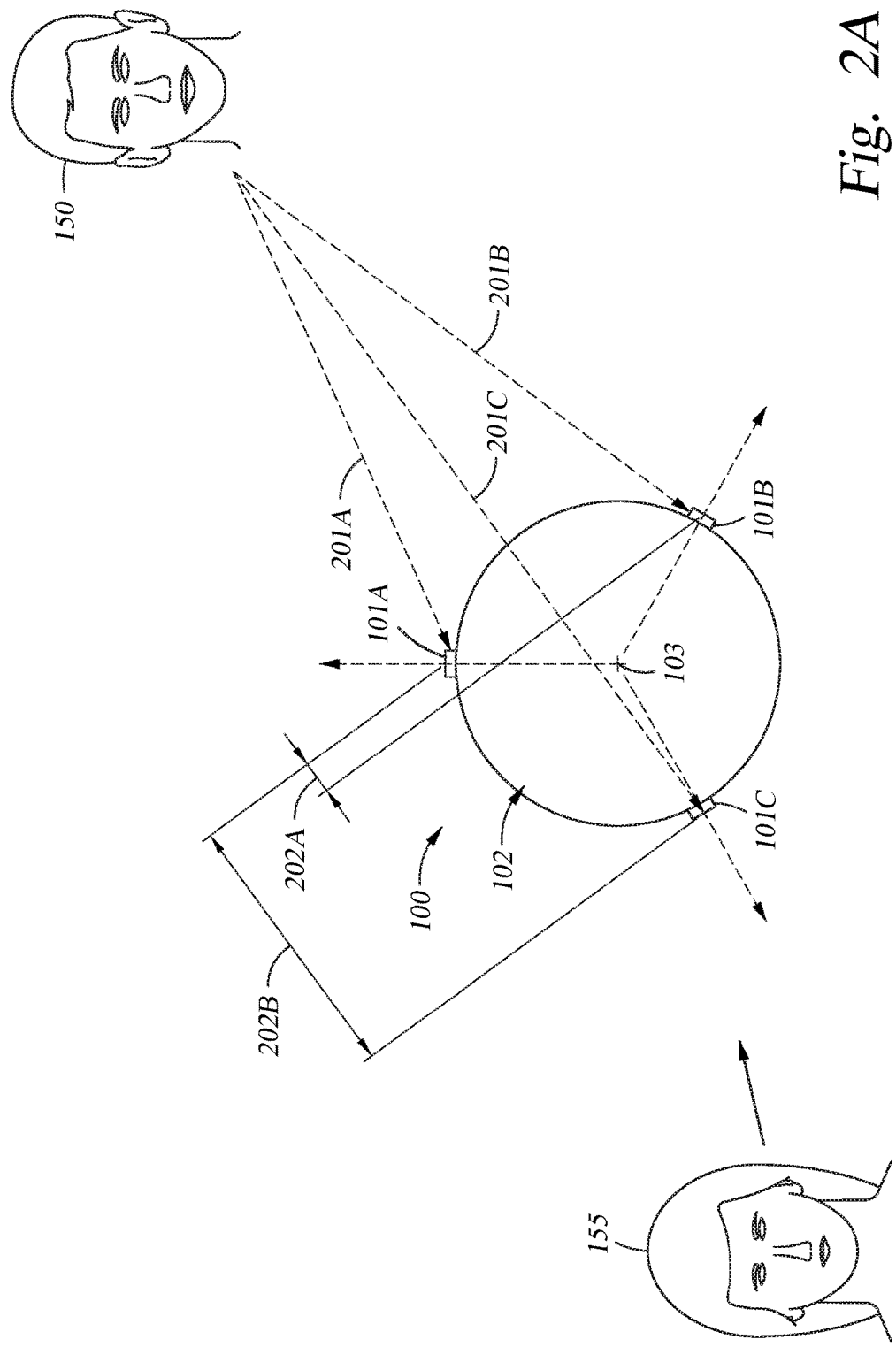
FIG. 2A is a diagram illustrating a plan view of an audible signal processing system and an audible source, according to one or more embodiments of the present disclosure.
Figure 2B:
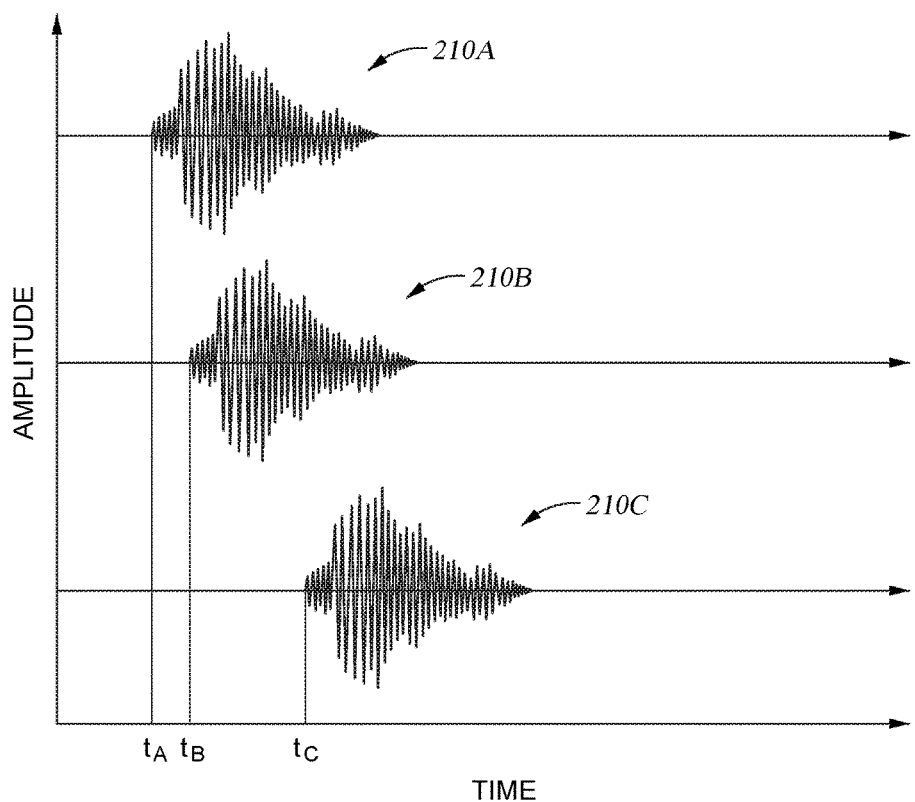
FIG. 2B is a graph depicting the time delay that each of the microphones illustrated in FIG. 2A will experience when an audible signal is delivered from the audible source to each of the microphones.

FIG. 2A illustrates one configuration in which the audible source 150 is positioned a first distance 201A from a first microphone 101A, a second distance 201B from a second microphone 101B and a third distance 201C from a third microphone 101C. Based on a far-field sound wave propagation assumption the time delay seen by microphone 101B and microphone 101C relative to the first microphone 101A, which is closest to the audible source 150, will be equal to the distance 202A between the first microphone 101A and the second microphone 101B in the direction of the received audible signal and the distance 202B between the first microphone 101A and the third microphone 101C in the direction of the received audible signal, respectively. FIG. 2B illustrates the delays that will be seen by the microphones 101A-101C when they detect the same audible signals 210A-210C, respectively, that are generated by the source 150. However, the audible signals that are received by the microphones 101A-101C will also receive audible signals from other unwanted sources 155 at various different times due to each microphone's relative position to the various unwanted sources 155. The signals from these unwanted sources 155 can prevent or obscure the electronic device 102 from detecting the desired information found with the audible signal received from the source 150.

One will note that the delay one microphone will experience versus another microphone is equal to the differences in distance of each microphone from the source and the speed of sound (e.g., 340.3 m/s at sea level). As illustrated in FIG. 2B, the audible signal 210A is received by microphone 101A at time $t_A$, and thus the delay that the microphone 101B has when it receives the audible signal 210B from the time when microphone 101A receives the audible signal 210A is equal to $t_B-t_A$. The delay that the microphone 101C has relative to microphone 101A due to the time when it receives the audible signal 210C versus when microphone 101A receives the audible signal 210A is equal to $t_C-t_A$. Thus, the time delay that each microphone may see relative to the other microphones within the geometrical array of microphones will depend on the relative orientation and position of the audible source to each of the microphones and their relative distance apart from each other. During the processing of the received audible signals by the audible signal processing system 100, some additional signal processing related temporal delays, such as sampling rate delays, may be generated.

Figure 3A:
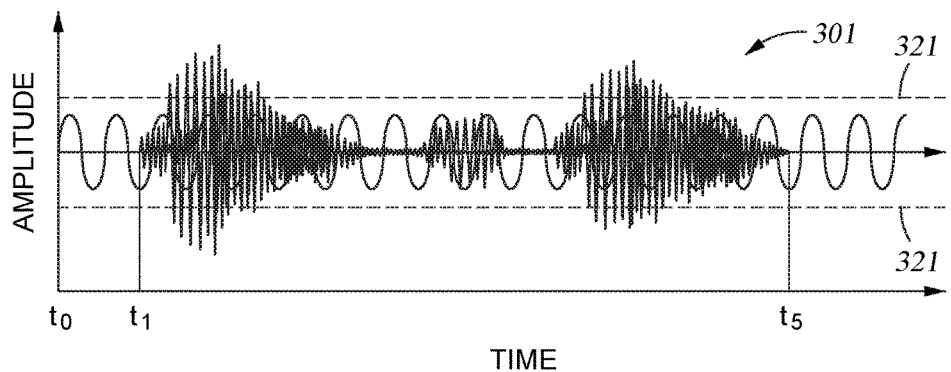
FIG. 3A is a graph depicting a composite audible signal that may be received by a microphone within the audible signal processing system, according to one or more embodiments of the present disclosure.
Figure 3B:
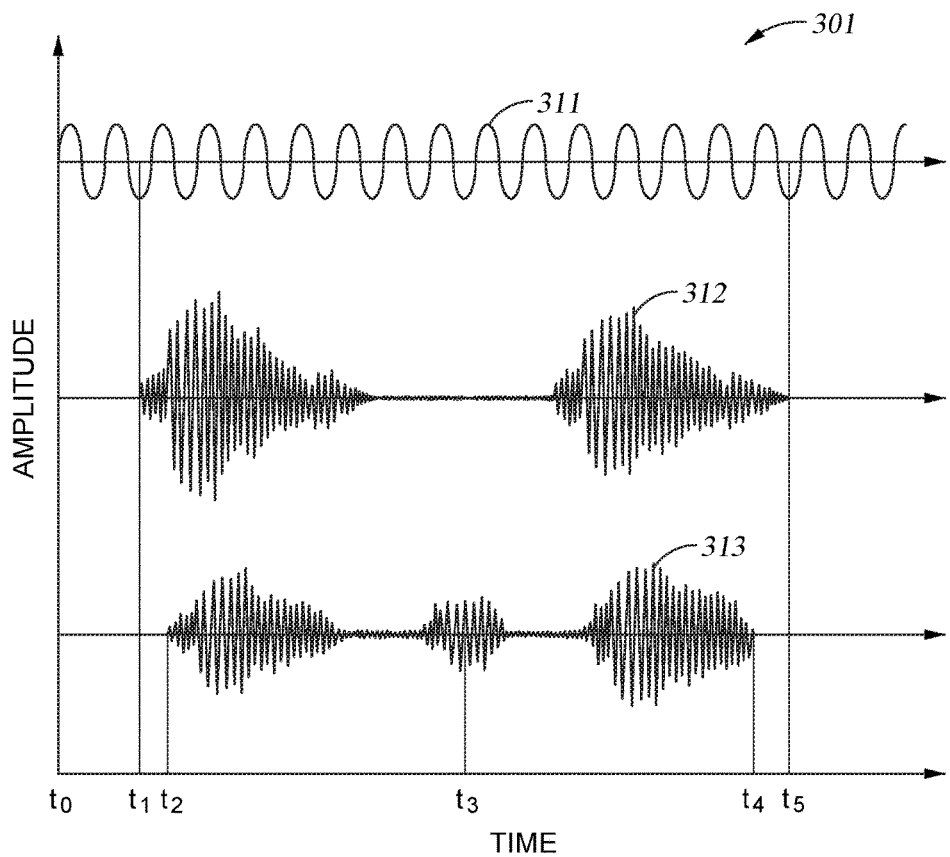
FIG. 3B includes graphs that depict the various components found within the composite audible signal illustrated in FIG. 3A.

FIG. 3A illustrates a composite audible signal 301 that may be received by a single microphone within the array of microphones found within the electronic device 102. The composite audible signal 301 will typically contain a desired audible signal provided from a desired audible source and a plurality of other audible signals received from other unwanted sources. FIG. 3B illustrates one possible configuration of a composite audible signal 301 that includes a constant audible noise signal 311 that is provided from a first noise source (e.g., unwanted sources 155), a desired audible signal 312 that is provided from a desired audible source (e.g., source 150), and a second audible noise signal 313 that is provided from a second noise source (e.g., unwanted sources 155). Thus, the composite audible signal 301 includes a plurality of audible signals generated from a plurality of audible sources, which include the desired audible signal 312 from a desired audible source. In one example, as illustrated in FIG. 3A, the desired audible signal 312 is received by a microphone between times $t_1$ and $t_5$ and has a varying intensity at different frequencies over time. Separately, the constant audible noise signal 311 may come from various common noise sources found in industrial, office or even conference room environments, such as fans, lighting, HVAC units or other common audible sources, and may in some cases include a low frequency audible signal. The second audible noise signal 313 may include audible signals that are generated by other audible sources, such as voices from other people in a room, music playing on a local speaker, or other unwanted noise sources. The second audible noise signal 313 will typically include audible signals provided at any frequency at any instant in time. In one example, as illustrated in FIG. 3B, the second audible noise signal 313 may extend between times $t_2$ and $t_4$ and have a varying frequency and intensity at different times.

One will note that the timing when each of the components of the composite audible signal 301 reach each microphone will differ in at least one characteristic depending on the distance of the various sources relative to each of the microphones within the array of microphones found in the electronic assembly 102. In other words, for example, the time when the second audible noise signal 313 and desired audible signal 312 overlap in time as detected by each microphone will differ, and thus the phase relationship and delay between each type of received audible signal component will vary relative to each other from microphone to microphone.

Therefore, one goal of the audible signal processing device 400 within the electronic device 102 is to remove as much of the audible signal received from the first and second types of noise sources so that the desired audible signal 312 can be separated therefrom. Once separated, the desired audible signal 312 can then be delivered to a software application that is configured to further process the desired audible signal so that some desired activity can be performed based on the receipt of the desired audible signal 312. In some embodiments, the desired audible signal 312 includes a user's speech that includes information across the full speech range, which typically extends between about 100 Hz and about 8,000 Hz.

The design and configuration of the microphones within a geometric array within the electronic device 102 can be made based on a balance of the need to have a microphone array configuration that has a desired spacing to assure that the direction of the received audible signal can be accurately determined, as will be discussed further below, versus the need to assure that the signal processing technique (e.g., cardioid and/or beam forming) can preferentially reject unwanted noise across the full speech range without the signal processing technique falling apart at either the higher end or the lower end of the frequency range. It is believed that most conventional spatial noise reduction techniques used today are unable to work at or are ineffective at the high end frequencies due to microphone spacing limitations or constraints, and thus most voice recognition or other similar programs are unable to effectively utilize the information found in the higher end of the speech range, such as between 4,000 Hz and 8,000 Hz.

Figure 4A:
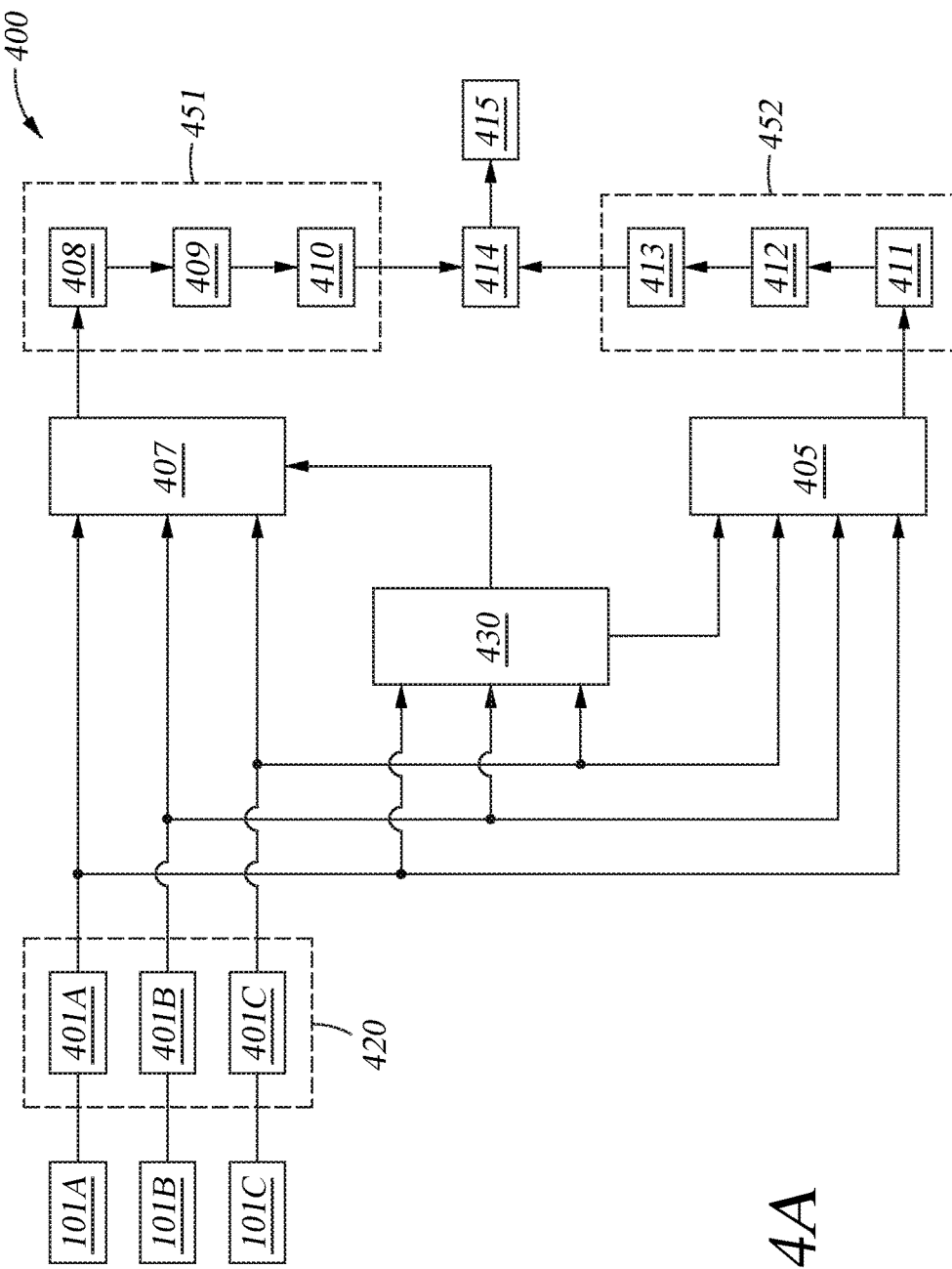
FIG. 4A is a schematic diagram illustrating an example of an audible signal processing device found within the audible signal processing system, according to one or more embodiments of the present disclosure.
Figure 4B:
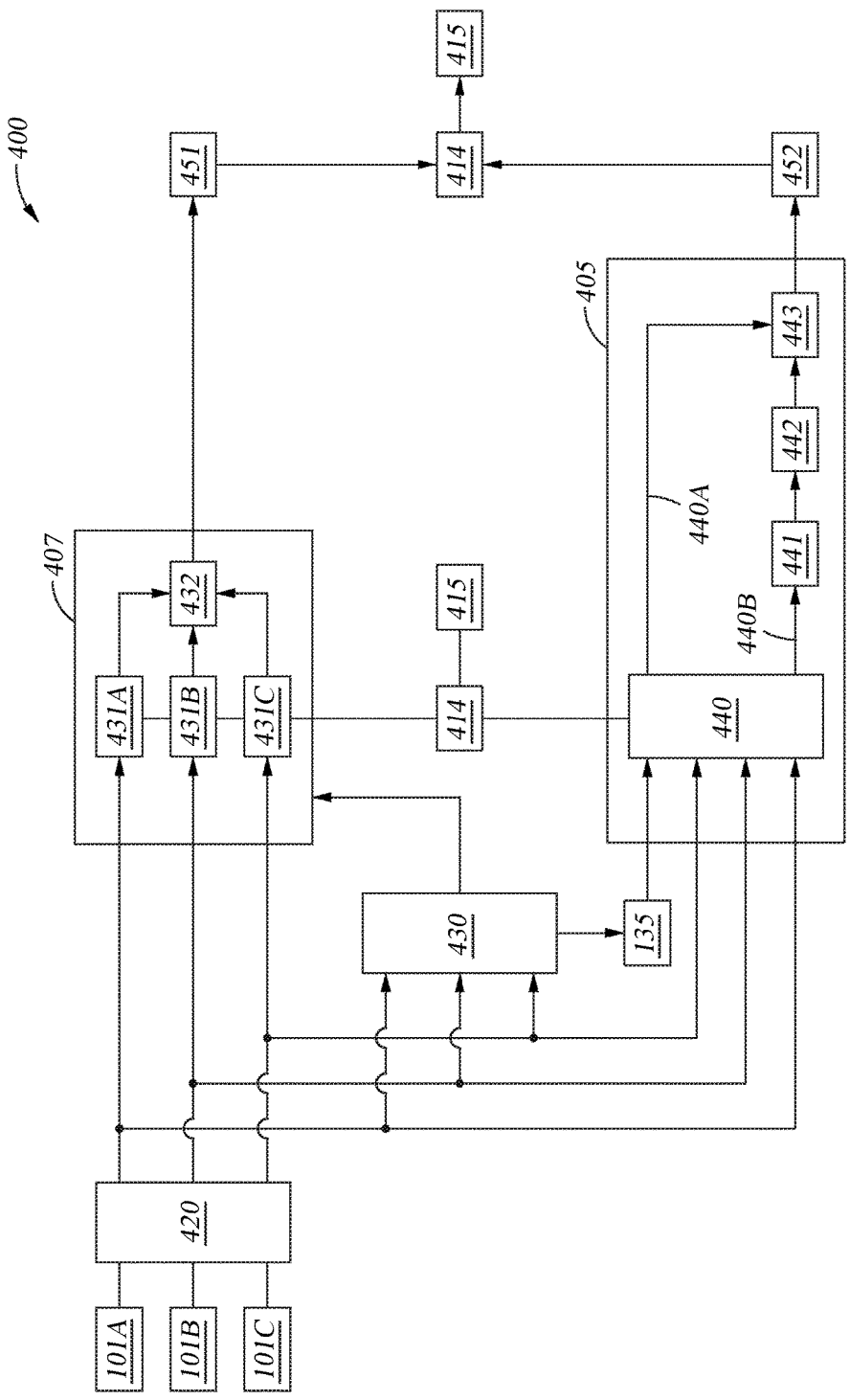
FIG. 4B is a schematic diagram illustrating portions of the audible signal processing device illustrated in FIG. 4A, according to one or more embodiments of the present disclosure.
Figure 4C:
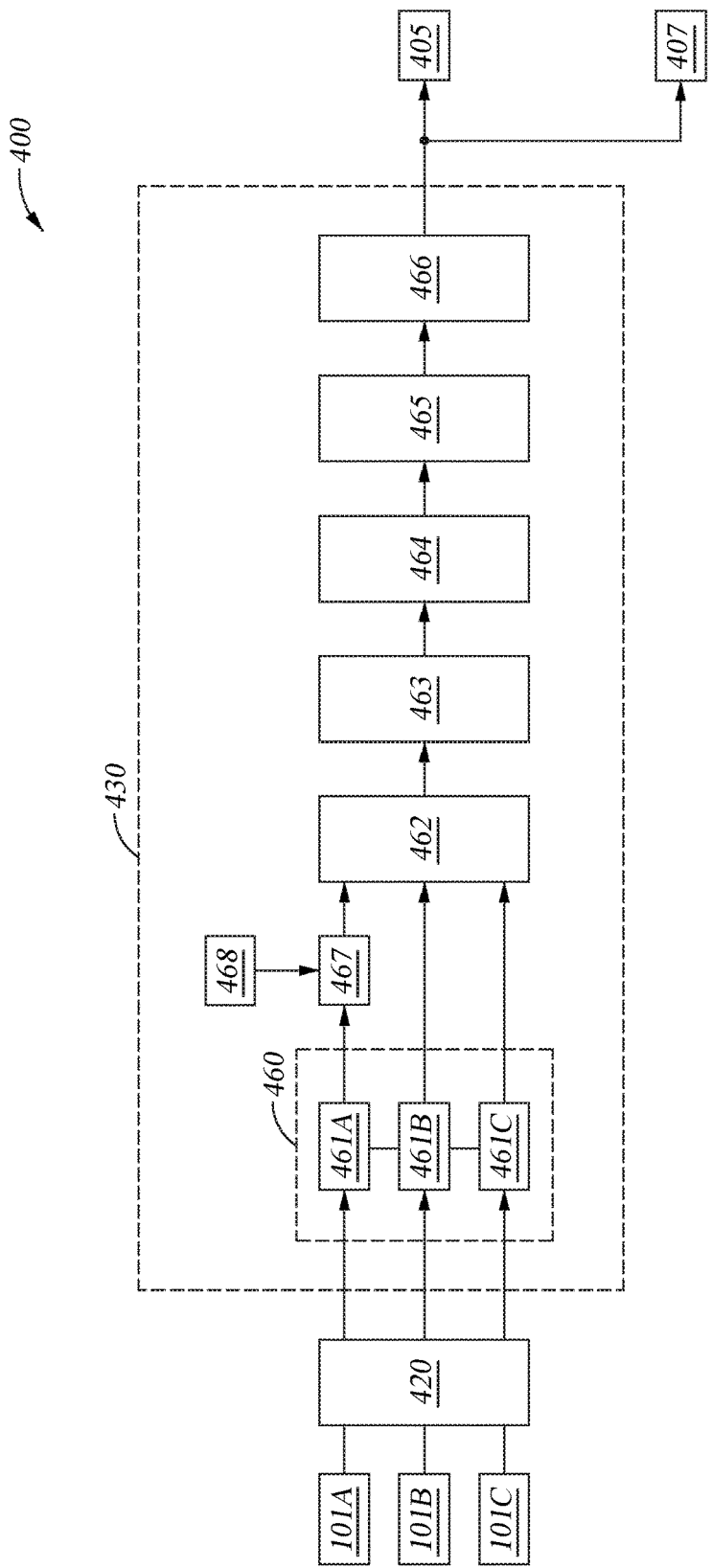
FIG. 4C is a schematic diagram illustrating a direction detection element of the audible signal processing device, according to one or more embodiments of the present disclosure.
Figure 5A:
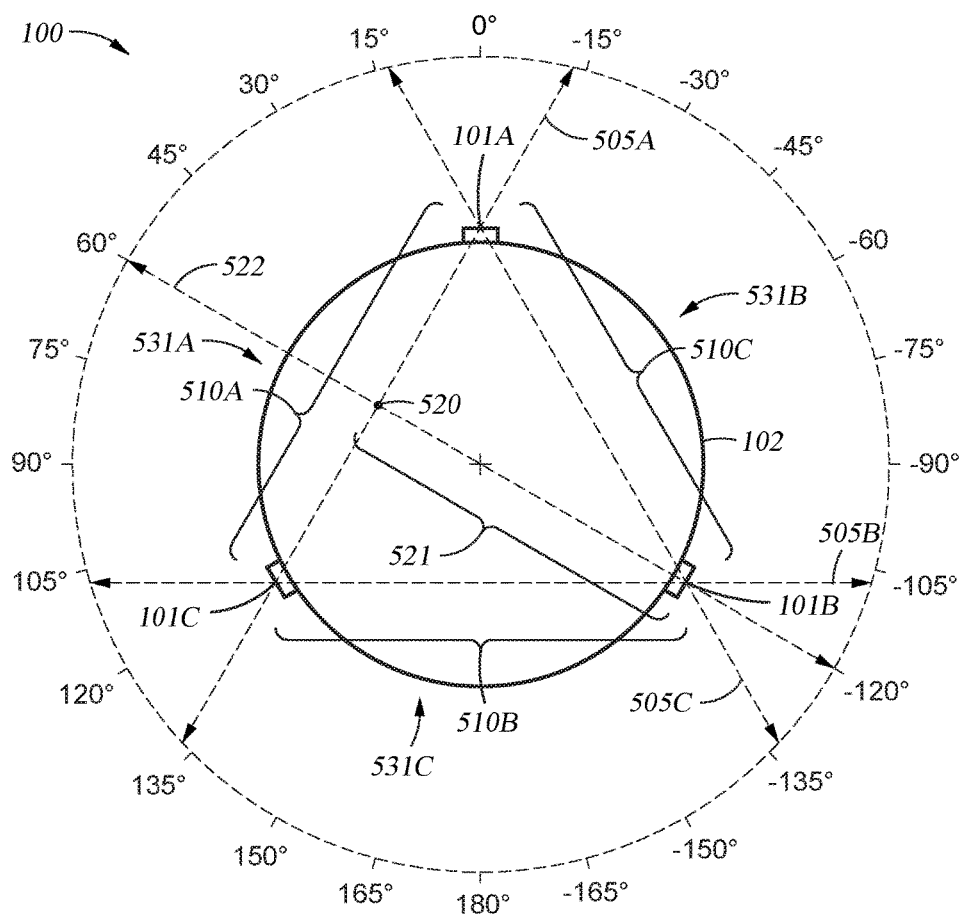
FIG. 5A is a plan view of an audible signal processing system having three microphones, according to an embodiment of the disclosure provided herein.

FIGS. 4A-4C are schematic diagrams illustrating the various system level components that form the audible signal processing device 400 which is adapted to process the audible signals received from the audible signal processing system 100 illustrated in FIG. 5A. While the audible signal processing system 100 illustrated in FIG. 5A and most of the subsequent discussion below describes a configuration in which three microphones 101A-101C are arranged in a planar circular array along the outer surface 108 of the audible signal processing system 100, this configuration is not intended to be limiting as to the scope of the disclosure provided herein. Other positions, orientations and numbers of microphones could also be used to perform one or more aspects of the disclosure provided herein.

FIG. 4A is schematic representation of one embodiment of the overall system that may be used to form the audible signal processing device 400. The audible signal processing device 400 will include an optional microphone gain element 420, a direction detection element 430, a first signal processor 405, a second signal processor 407, one or more post processing elements 451, 452 and a signal combining element 414. The signal combining element 414 will then provide the processed audible signal (e.g., desired audible signal) to a downstream element 415. The downstream element 415 may include a software application or other electronic device that uses the processed audible signal to perform some desired activity. The various elements and/or components described herein in conjunction with the audible signal processing device 400 may be implemented by use of various analog and digital electrical components that are used in combination with a controlling software program, or controlling software programs, that are executed by use of the processor 118, I/O devices 116 and memory unit 122. In some embodiments, the controlling software program(s) and various components within the audible signal processing device 400, such as the direction detection element 430, the first signal processor 405 and the second signal processor 407, can be brought into an active state by use of a physical or audible command received from a user. In one embodiment, the controlling software program(s) and various components within the audible signal processing device 400 are in a power saving idle state until a physical or audible command is received from a user. In one embodiment, the controlling software program(s) and various components within the audible signal processing device 400 are in a power saving idle state until an audible command having a desired audible signal level is received from a user. Referring to FIG. 3A, in one example, the controlling software program(s) compares a received composite audible signal 301 with a set audible signal level 321, which is stored as a parameter in memory, to determine if the received composite audible signal 301 exceeds the audible signal level 321, and thus a desired audible signal has been received from a user at one or more instants in time. In other embodiments, the controlling software program(s) is always running in the background while the electronic device 102 is powered on.

FIG. 4B is schematic representation of the various circuit elements found within the first signal processor 405 and second signal processor 407, which will be discussed further below. FIG. 4C is schematic representation of the various circuit elements found within the direction detection element 430 of the audible signal processing device 400, which will also be discussed further below.

The optional microphone gain element 420 typically includes microphone signal gain adjusting elements that are adapted to adjust the signal level of input received from each of the microphones within the geometrical array of microphones. As illustrated in FIG. 4A, microphone signal gain adjusting element 401A-401C are configured to separately adjust the signal level of the input received from each of the microphones 101A-101C, respectfully, so that the incoming signal levels provided from each microphone are similar when they are processed by the various elements in the audible signal processing device 400. A microphone signal gain adjusting element 401 will include analog and digital electrical circuit components that are configured and adjusted to provide a desired gain for an upstream microphone 101.

Referring to FIGS. 4A and 5A, the audible signal processing device 400 is configured to process the audible signals received by the plurality of the microphones 101A-101C using a first signal processing technique that is performed by the first signal processor 405 and a second signal processing technique that is performed by the second signal processor 407. The audible signal processing device 400 is then configured to combine the signals processed by the first and second signal processors 405 and 407, by use of the signal combining element 414, to form a desired audible signal that has a high signal-to-noise ratio throughout a desired frequency range, such as the full speech range. Signal-to-noise ratio may be defined and/or measured as the ratio of desired signal power to the noise power, which is often expressed in decibels.

First Signal Processor Example

In some embodiments, the first signal processor 405 is configured to separate unwanted low frequency noise from the detected audible signals received from two or more of the microphones within the geometrical microphone array, while the second signal processor 407 is generally configured to separate unwanted higher frequency noise from the detected audible signals received from all of the microphones within the geometrical array.

Figure 6A:
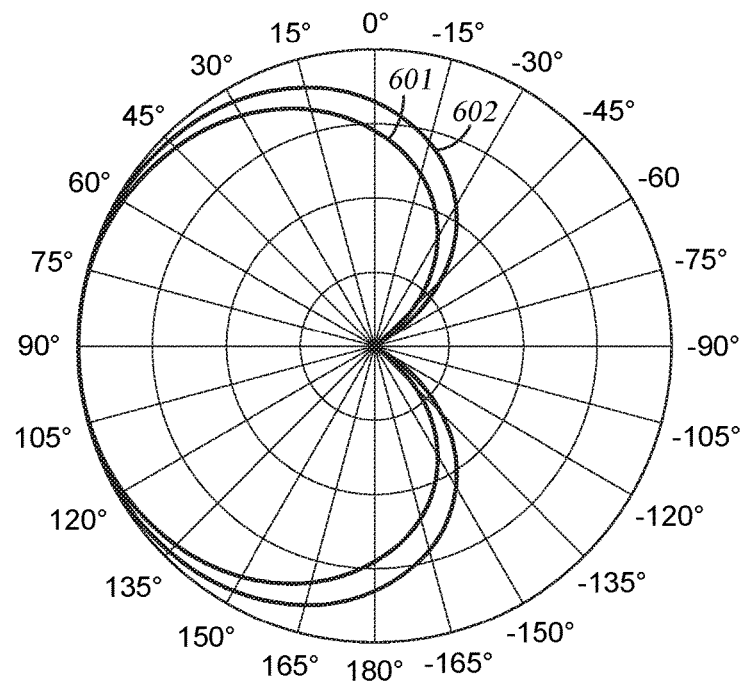
FIGS. 6A-6C illustrate examples of cardioid patterns that are formed at different frequencies by use of a first signal processing technique, according to an embodiment of the disclosure provided herein.
Figure 6B:
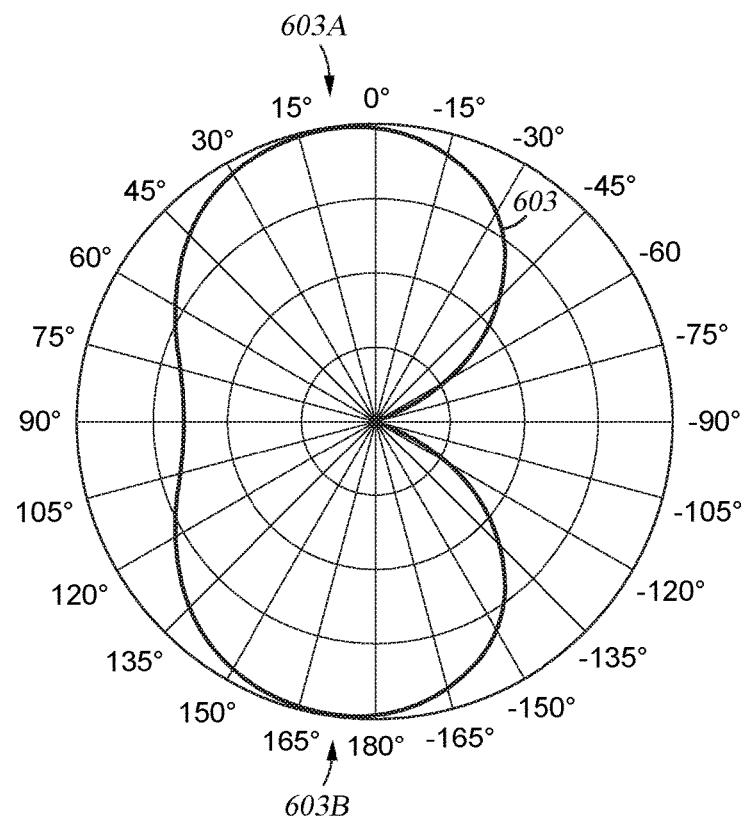
Figure 6C:
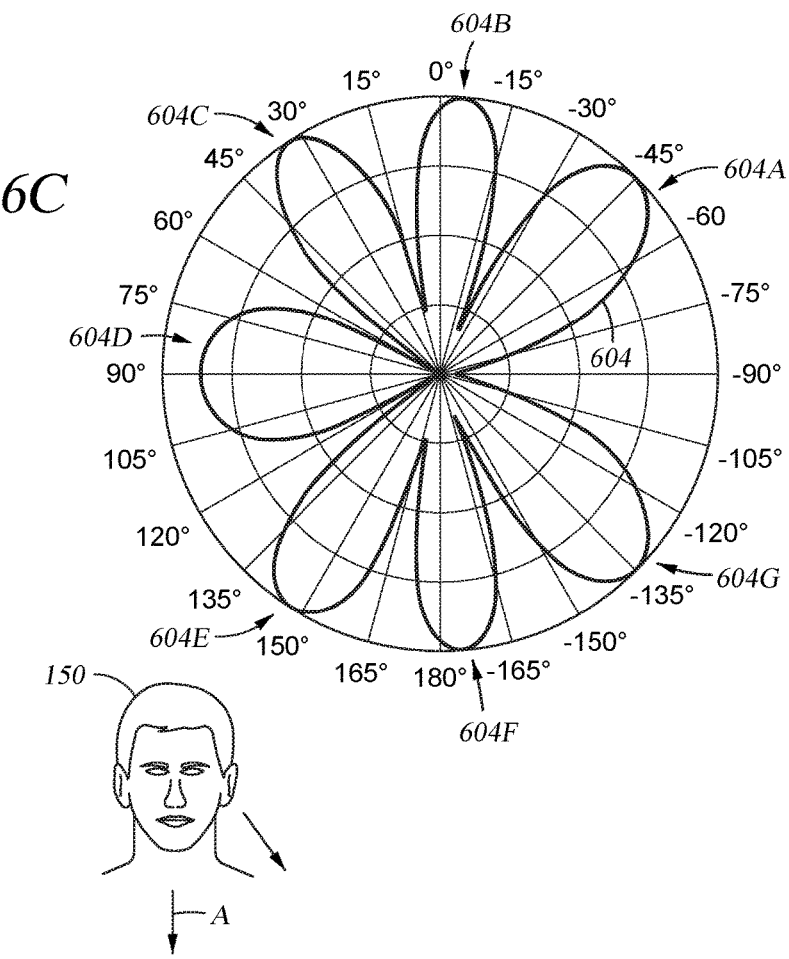
Figure 6D:
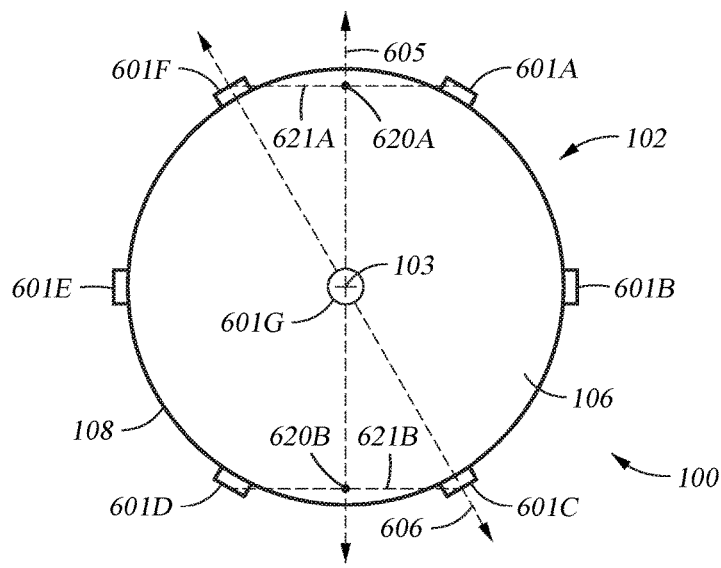
FIG. 6D is a plan view of an audible signal processing system having seven microphones, according to an embodiment of the disclosure provided herein.

In general, the first signal processor 405 is adapted to remove or separate noise found within the lower end of the audible signal frequency range from received composite audible signal using a cardioid noise rejection technique. In order to perform the first signal processing technique, the first signal processor 405 will include or use portions of the controlling software program and various analog and digital hardware components to perform the desired processes described herein. In some embodiments, the first signal processor 405 includes elements that are formed within a digital signal processor (DSP) module. In some embodiments, the first signal processor 405 is adapted to remove or separate the unwanted noise from a desired audible signal using a cardioid signal processing technique. The cardioid signal processing technique performed by the first signal processor 405 is generally adapted to reject noise received from an off axis direction relative to the direction of a desired audible signal source using a pattern that is similar to an endfire cardioid. FIGS. 6A-6C illustrate the various shapes of cardioid based patterns generated using two microphones, which are a fixed distance apart, at various different frequencies. As will be discussed further below, the controlling software used within the audible signal processing device 400 may utilize two or more microphones within the geometrical array to separate unwanted low frequency noise from the detected audible signals using a first-order cardioid, second-order cardioid, hyper-cardioid, super-cardioid or other similar cardioid technique.

In some embodiments, a first-order cardioid is formed by the first signal processor 405 by use of two audible signal inputs that are positioned along a direction that is in-line with the direction that the audible signal is received from the audible signal source. In one embodiment, the first-order cardioid is formed using two audible signal inputs that are received from two of the microphones found within the geometrical array of microphones. Additionally or alternately, as will be discussed further below, the cardioid pattern is formed by averaging the inputs from two microphones to form a virtual microphone audible signal and then using the formed virtual microphone's audible signal and an audible signal from one of the other microphones in the geometrical array to from the first-order cardioid. While other higher-order cardioid forming signal processing techniques could be used by the first signal processor 405, it is believed that the use of a first-order cardioid for the low frequency signal processing has advantages over these higher-order cardioid signal processing techniques. In general, from a power conservation stand point, it is desirable to use a fewer number of microphones to perform the signal processing techniques disclosed herein. Thus, a first-order cardioid generation technique has advantages over other signal processing techniques that need an increased number of microphones to form the higher order cardioid patterns. One will note that a large portion of the power consumption is created by the process of reading, comparing and then writing to a buffer the audible signals, and performing other related pointer math, for each of the microphones within the electronic device at the high sampling rates required to perform these types of signal processing techniques. In another example, it is believed that higher-order cardioid signal processing techniques will require additional computing power and time to process the audible signals received from three or more microphones. The additional amount of computing power can thus create a significant drain on a battery powered type of power source 130.

In some embodiments, the first order cardioid noise rejection technique utilized by the first signal processor 405 can be achieved by summing audible signals received by two microphone elements within the geometrical array of microphones, where one of the audible signals is inverted and delayed a period of time relative to the other received audible signal before the two audible signals are then summed together. The amount of time delay generated by the first signal processor 405 is related to the speed of sound and the effective distance between the microphones in the direction that the desired audible signal is received. The first signal processing technique is able to form a desired cardioid pattern for rejecting unwanted noise received from off-axis orientations as long as the wavelength is much longer than the distance between the two microphones used to form the cardioid pattern. However, the ability to reject unwanted noise in a cardioid pattern degrades once the wavelength approaches a proportional distance between the microphones. Therefore, the closer the microphones are to each other, the higher in frequency the cardioid pattern can be maintained.

FIG. 6A illustrates an example of a pattern 601 that is formed by the first signal processing technique using two microphones that are a fixed distance apart (e.g., 70 mm) at a first frequency of about 100 Hz. One will note that a desired audible source would be desirably positioned at the 90° position relative to the orientation of the polar graph, such that the maximum amount of audible signal is accepted from this direction while the amount of audible signal that is accepted from other off-axis directions decreases all the way to zero at the −90° direction (e.g., 180° from the desired audible source's direction). FIG. 6A also includes a second pattern 602 that is formed at a second frequency of about 1200 Hz using the same two microphones. One will note that by changing the frequency from 100 Hz to about 1200 Hz the ability of the first signal processing technique to reject off-axis noise sources, such as noise sources positioned outside of the angular range extending between about 45° and about 135°, decreases a noticeable amount as the detected audible signal frequency has increased. Therefore, geometrical microphone arrays that contain the spacing used to form the patterns shown in FIGS. 6A-6C will be ineffective at frequencies that exceed the point where the cardioid pattern breaks down (e.g., −1200 Hz), and thus, in this example, the first signal processing technique will generally not be effective for use with audible signals that contain frequencies greater than 1200 Hz.

FIG. 6B illustrates an example of a third pattern 603 that is formed by the first signal processing technique at a third frequency of about 2000 Hz using the same two microphones used to form the pattern 601. In this example, the third pattern 603 has become distorted due to the effect of frequency on the detected signal such that it has formed two lobes 603A and 603B. The third pattern 603 is substantially different from the pattern 601 illustrated in FIG. 6A, since the ability of the first signal processing technique to reject off-axis noise sources in the 15° and 165° directions due to the lobes 603A and 603B will be non-existent, while the first signal processing technique will tend to reject nearly half of the audible signal received from a desired audible source that is positioned at the 90° position.

FIG. 6C illustrates an example of a fourth pattern 604 that is formed at a fourth frequency of about 8000 Hz by the same two microphones used to form the first pattern 601. In this example, fourth pattern 604 of the first order mic array has also become distorted due to the effect of frequency on the detected signal such that it contains seven lobes 604A-604G. Therefore, the ability of the first signal processing technique to reject off-axis noise sources in the seven directions of the lobes 604A-604G (e.g., 0°, 45°, 135°, etc.) will be minimal, while the first signal processing technique will tend to reject less than about 5 dB of the audible signal received from a desired audible source that is positioned at the 90° position.

While the discussion surrounding FIGS. 6A-6C all discuss the effect that frequency has on the ability of the first signal processing technique to reject off-axis noise sources, similar effects can be seen by adjusting the hardware design such as the spacing between the two microphones used to form the cardioid based pattern. For example, a similar pair of patterns 601 and 602 (FIG. 6A) can be formed when the distance between the two microphones is reduced from a distance of 70 mm to about 35 mm using the same measurement frequency of about 1100 Hz. Therefore, in some embodiments, the relative spacing between the various microphones may be adjusted in the audible signal processing system 100 so that the upper end of the frequency range that the first signal processing technique can operate is desirably set. In some embodiments, the upper end of the frequency range of the first signal processing technique is set so that the transition to the frequency range that the second signal processing technique can perform its desired function (i.e., remove higher frequency noise) at least partially overlap. The process of adjusting the upper end of the first signal processing technique and the lower end of the second processing technique is discussed further below in conjunction with FIGS. 8A-8C. Alternately, in some embodiments, the upper end of the frequency range of the first signal processing technique is set to a level where the generated cardioid based pattern does not become significantly distorted, such as where two or more lobes are formed and/or the attenuation of the desired audible signal that is delivered in a desired audible source's direction (e.g., 90° in FIG. 6A-6C) is less than about 1 to 5 dB. For example, the upper end of the frequency range may be selected such that the wavelength is on the order of the distance between the microphones used to form the pattern generated by the first signal processing technique. Alternately, in another embodiment, the upper end of the frequency range is between about 500 Hz and about 4,000 Hz, such as in a frequency range between about 1000 Hz and about 4,000 Hz. In some examples, the upper end of the frequency range is about 700 Hz, about 1000 Hz, about 1500 Hz, about 2000 Hz, or even about 4000 Hz.

Figure 4D:
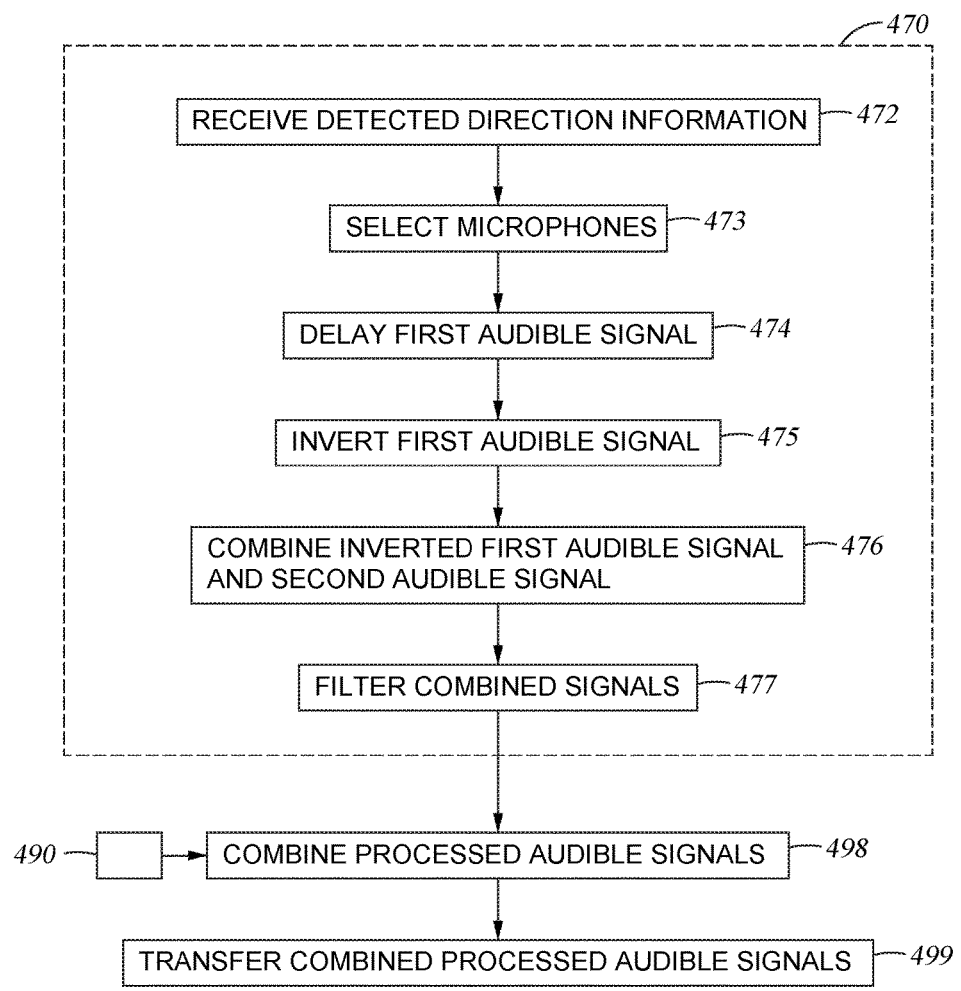
FIG. 4D illustrates a method of performing a first type of signal processing technique, according to one embodiment of the present disclosure.

Referring back to FIG. 4B, the first signal processor 405 generally includes a microphone input selection element 440, a signal delaying element 441, a signal inverting element 442, a signal combining element 443 and a signal filtering element 411, a parametric Equalizer 412 and a mix gain amplifier 413 within the post processing element 452. FIG. 4D illustrates a method 470 of performing a first type of signal processing technique using the first signal processor 405. During the operation, at step 472, the first signal processor 405 first receives detected direction information from the direction detection element 430 based on an analysis of audible signals received by the geometrical array of microphones. The detected direction information then allows the cardioid generation process to be performed so that off-axis noise can be rejected as described above. Referring to FIGS. 5A and 6A, in one example, if the detected direction of the desired audible source is found to be in the 90° direction by an analysis performed by the direction detection element 430, a cardioid pattern that is oriented similarly to the patterns 601 and 602 will be generated by the first signal processor 405.

Next at step 473, the microphone input selection element 440 selects two microphones within the geometrical array of microphones based on the detected direction information received from the direction detection element 430. In this example, the first signal processor 405 performs an analysis of the audible signals received by the microphones 101B and 101C, since they are aligned along a line 505B that extends in the 90° and −90° directions.

After the desired pair of microphones has been selected, steps 474 and 475 are completed, which includes the delivery of the audible signal received from the microphone furthest from the audible signal source (e.g., microphone 101B) to the signal delaying element 441 and a signal inverting element 442, by the delivery of the audible signal along path 440B of the first signal processor 405, to form a delayed and inverted audible signal. The time delay used by the signal delaying element 441 is set by the known distance between the two microphones based on the known speed of sound. The time delay value used may be stored and retrieved from the memory unit 122.

Next, at step 476, the "undelayed" audible signal received from the microphone closest to the audible signal source (e.g., audible signal received from microphone 101C along path 440A) and the delayed and inverted audible signal are then combined together by use of the signal combining element 443.

Next, at step 477, the combined signals are then optionally filtered by use of the signal filtering element 411 within the post processing element 452. The signal filtering element may include a low pass filter and or a high pass filter that are able to remove frequencies that are higher and/or lower than the useable signal processing range of the first signal processor 405, such as frequencies where the cardioid pattern become significantly distorted. For example, a low pass filter frequency may coincide with a frequency between about 1,000 Hz and about 4,000 Hz, and a high pass filter frequency may coincide with a frequency of about 100 Hz.

After the processes performed in method 470 have been completed the first signal processor 405 will then provide the processed audible signal, or hereafter first processed audible signal, to the signal combining element 414 where, in step 498, the first processed audible signal and a second processed audible signal received from the second signal processing technique are combined. As will be discussed further below, at step 499, the combined first and second processed audible signals are then transferred to other downstream electronic devices or elements within the audible signal processing system 100.

Therefore, based on the geometrical array of microphones illustrated in FIG. 5A, audible signal sources that are aligned in the directions parallel to line 505A, line 505B or line 505C can be accurately represented by a generated cardioid pattern. Line 505A can be used when the audible signal sources are aligned in directions −30° and 150°. Line 505B can be used when the audible signal sources are aligned in directions 90° and −90°. Line 505C can be used when the audible signal sources are aligned in directions 30° and −150°. However, audible sources that are not aligned with the directions illustrated by lines 505A-5050 will have less accurate noise rejection due to the off angle error produced when the misaligned cardioid pattern is generated by the first signal processor 405.

In an effort to reduce the off-angle error produced when the selected microphones are not aligned in the exact direction of the audible source, a virtual microphone can be used to minimize or effectively eliminate any error created by the misalignment of the formed cardioid pattern relative to the audible source. A virtual microphone can be created by combining the audible signals received by two microphones within the geometric array to form a microphone that is effectively positioned at a point along a line that extends between the two microphones. The combined audible signal will generally approximate a portion of an audible signal that would have been received by a virtual microphone that is positioned between the first and second microphones. The process of combining the audible signals may include averaging, or even weighting, the two audible signals received by the two selected microphones within the geometric array to form a virtual microphone audible signal that can then be used by the first signal processing technique in a similar way that an audible signal from an "actual" microphone is used. For example, referring to FIG. 5A, if the direction detection element 430 determines that the audible source is positioned at a direction of about 60°, the first signal processor 405 can then average the audible signals received by the first microphone 101A and the third microphone 101C to form a virtual microphone 520 that is positioned at the midpoint of the portion of the line 505A that extends between the two microphones. The first signal processor 405 can then use the generated virtual microphone 520 and a second microphone (e.g., microphone 101B) to complete the first-order cardioid generation process. In this example, the first signal processor 405 performs an analysis of the audible signals effectively received by the virtual microphone 520 and microphone 101B, since these microphones are aligned along the line 522 that extends in the 60° and −120° directions. After the desired pair of microphones has been selected (e.g., step 473), the cardioid generation process will then include the delivery of the audible signal received from the microphone 101B to the signal delaying element 441 (e.g., step 474) and a signal inverting element 442 (e.g., step 475) by the delivery of the audible signal along path 440B to form a delayed and inverted audible signal. The time delay value used by the signal delaying element 441 is set by the distance between these two microphones, which in this case is the distance 521, and the known speed of sound. The time delay value that is used may be stored and retrieved from the memory unit 122. One will note that the distance 521 is smaller than the distances 510A-510C, and thus will have an effect on the frequency limit for the first signal processing technique, and thus may be accounted for by the first signal processor 405. Next, the "undelayed" audible signal received from the microphone closest to the audible signal source (e.g., virtual microphone 520) and the delayed and inverted audible signal received from the second microphone 101B are then combined together (e.g., step 476) by use of the signal combining element 443 and then filtered by use of the signal filtering element 411 within the post processing element 452. After the processes within method 470 have been performed, the first signal processor 405 will then provide the virtual microphone containing processed audible signal to the signal combining element 414 where, in step 498, the first processed audible signal and a second processed audible signal received from the second signal processing technique are then combined. As will be discussed further below, at step 499, the combined first and second processed audible signals are then transferred to other downstream electronic devices or elements within the audible signal processing system 100.

Therefore, by generating virtual microphones that are positioned along a line that extends between two microphones, the maximum off angle error that is produced when the selected microphones are not aligned in the exact direction of the audible source can be reduced by at least half of the angle formed between the microphones used to form the virtual microphone. For example, the virtual microphone in the above example would thus effectively have a microphone positioned every 60° versus the actual 120° distance between each of the three actual microphones 101A-101C. Thus, by use of a microphone signal averaging technique to form the virtual microphone the first signal processing technique can be used to detect audible signals found in at least 12 different directions while using only 3 microphones. Alternately, for virtual microphone generation techniques that use a weighted sum of the audible signals received by two or more microphones the first signal processing technique could find an infinite number of possible directions to position the virtual microphone along the line extending between the microphones while using only 3 microphones. The weighting values used to create the weighted sum of the audible signals may be based on a comparison of the determined direction received from the direction detection element 430 and its relationship (e.g., relative angle) to one of the six directions that are parallel to lines 505A, 505B or 505C. Therefore, as noted above, by use of the virtual microphone technique a fewer number of microphones are needed to perform the first signal processing technique and thus less power will be consumed by the electronic device in performance of this signal processing technique.

In some virtual microphone generating embodiments, it is desirable to select two microphones that are positioned along a line that is substantially perpendicular to the direction that an audible signal is received to form the virtual microphone. Also, by increasing the number of actual microphones found within the geometrical array of microphones the need for the generation of virtual microphones can be reduced, since the error will be reduced.

Alternate First Signal Processing Example

Alternately, in electronic device configurations that are not limited by electrical power constraints (e.g., electrical power is received from a wall plug or large battery) and/or limited by the processor's speed and other processor related resources it may be desirable to remove or separate noise found within the audible signal frequency range by use of a cardioid noise rejection technique that uses a higher order cardioid than a first order based cardioid signal processing technique. In some embodiments, the first signal processor 405 is adapted to remove noise using a second-order or greater cardioid based signal processing technique. In one configuration, the cardioid signal processing technique performed by the first signal processor 405 is adapted to reject noise received from an off-axis direction relative to the audible signal's direction using three or more microphones within the geometrical array. The controlling software used within the audible signal processing device 400 may thus utilize three or more microphones and/or generated virtual microphones that are aligned in a desired direction to separate unwanted noise from the detected audible signals using a cardioid pattern.

In some embodiments, the first signal processing technique is adapted to form higher order cardioid patterns by use of three or more audible signal inputs that are positioned along a direction that is in-line with the direction that the audible signal is received from the audible signal source. In one embodiment, the higher order cardioid is formed using the three or more audible signal inputs that are received from the microphones found within the geometrical array of microphones.

Additionally or alternatively, the higher order cardioid patterns are formed by combining (e.g., averaging or weighting) the inputs from two or more microphones to form a virtual microphone audible signal and then using the formed virtual microphone's audible signal and an audible signal from one of the other microphones or other virtually formed microphones to from the higher order cardioid.

FIG. 6D illustrates an example of a geometrical array configuration that may be used by the first signal processing technique to form a desired cardioid pattern. In this example, the audible signal processing system 100 includes seven microphones 601A-601G that are arranged in a geometrical array, which contains six microphones disposed along the outer surface 108 (e.g., microphones 601A-601G) and at the center point 103 of the top surface 106 (e.g., microphone 601G) of the electronic device 102. However, one skilled in the art will appreciate that other geometrical array configurations can be used by the first signal processing technique to form higher order cardioid patterns. In one example, the geometrical array may include five microphones that are arranged in a configuration that includes four microphones disposed along the outer surface 108 and one microphone at the center point 103. In some embodiments, the geometrical array includes a plurality of microphones that are only disposed along the outer surface 108 of the electronic device 102, such as an array that contains only six microphones 601A-601G (FIG. 6D), or other useful odd or even number of microphones in the geometrical array.

During operation, the first signal processor 405 receives audible signal direction information from the direction detection element 430 noting that audible signals are being received from a direction 605 (i.e., 0° direction). The first signal processor 405 will then determine by use of the controlling software and microphone input selection element 440 that microphone 601G, a virtual microphone 620A, and a virtual microphone 620B are needed to perform the first signal processing technique, since these microphones are aligned along the direction 605. In this example, once the controlling software has formed the virtual microphone 620A by averaging the audible signals received by microphones 601A and 601F, and virtual microphone 620B has been formed by averaging the audible signals received by microphones 601C and 601D, the process of forming the desired cardioid pattern can be completed. In this example, the virtual microphone 620A is positioned at the midpoint of line 621A and the virtual microphone 620B is positioned at the midpoint of line 621B.

Next, the first signal processor 405 then uses a cascaded cardioid generation process to perform the first signal processing technique. The cascaded cardioid generation process begins by the delivery of the audible signal received from the microphone 601G to the signal delaying element 441 (e.g., step 474) and the signal inverting element 442 (e.g., step 475) to form a first delayed and inverted audible signal. The time delay value that is used may be stored and retrieved from the memory unit 122 for this known microphone configuration. The "undelayed" audible signal received from the virtual microphone 620A and the first delayed and inverted audible signal received from the second microphone 601G are then combined together (e.g., step 476) by use of the signal combining element 443 to form a first combined cascaded audible signal that is stored within memory.

The cascaded cardioid generation process then continues on to form a second combined cascaded audible signal by delivering the audible signal received from the second virtual microphone 620B to the signal delaying element 441 (e.g., step 474) and the signal inverting element 442 (e.g., step 475) to form a second delayed and inverted audible signal. The "undelayed" audible signal received from microphone 601G and the second delayed and inverted audible signal are then combined together (e.g., step 476) by use of the signal combining element 443 to form a second combined cascaded audible signal that is stored within memory.

The cascaded cardioid generation process then delivers the second combined cascaded audible signal to the signal delaying element 441 (e.g., step 474) and the signal inverting element 442 (e.g., step 475) to form a first combined delayed and inverted audible signal. The time delay value that is used may be stored and retrieved from the memory unit 122. Then, the first combined cascaded audible signal and the first combined delayed and inverted audible signal are then combined together (e.g., step 476) by use of the signal combining element 443 and then filtered by use of the signal filtering element 411 to form the complete combined cascaded audible signal.

After a complete combined cascaded audible signal has been formed, the first signal processor 405 will then provide the complete combined cascaded audible signal to the signal combining element 414 where, in step 498, the complete combined cascaded audible signal and a second processed audible signal received from the second signal processing technique are combined. As will be discussed further below, at step 499, the combined signals are then transferred to other downstream electronic devices or elements within the audible signal processing system 100.

In cases where the audible signal source is aligned with a direction that includes three "actual" microphones, such as direction 606 in FIG. 6D, the cascaded cardioid generation process can be performed using only the three microphones, and thus no virtual microphones. In this example, the first signal processor 405 will then determine by use of the controlling software and microphone input selection element 440 that microphone 601F, microphone 601G, and microphone 601C are needed to perform the first signal processing technique. Then, as similarly discussed above, the first signal processing technique then uses the three microphones and above described process steps to similarly form the complete combined cascaded audible signal.

In electronic device configurations that include an array of microphones which are primarily disposed along the outer surface 108 of the electronic device 102, such as configurations where no centrally positioned microphone exists, a virtual microphone can be used in place of a centrally positioned microphone by averaging the audible signals received by two or more microphones within the geometric array. Referring to FIG. 6D, in one example, a virtual microphone can be formed at the center point 103 by averaging the audible signals received by microphones 601B and 601E. Thus, in some cases, a cascaded cardioid generation process can be performed using only two "actual" microphones and one virtual microphone. Therefore, in relation to the previous example, the first signal processor 405 can determine by use of the controlling software and microphone input selection element 440 that microphone 601F, microphone 601C, microphone 601B and microphone 601E are needed to perform the first signal processing technique. In this example, microphones 601B and 601E are used to form the centrally positioned virtual microphone, and then the formed virtual microphone and microphones 601F and 601C are used to perform the first signal processing technique. Then, as similarly discussed above, the first signal processing technique then uses these "actual" and virtual microphones and the above described process steps to similarly form the complete combined cascaded audible signal.

Direction Detection Process and Elements

Figure 4E:
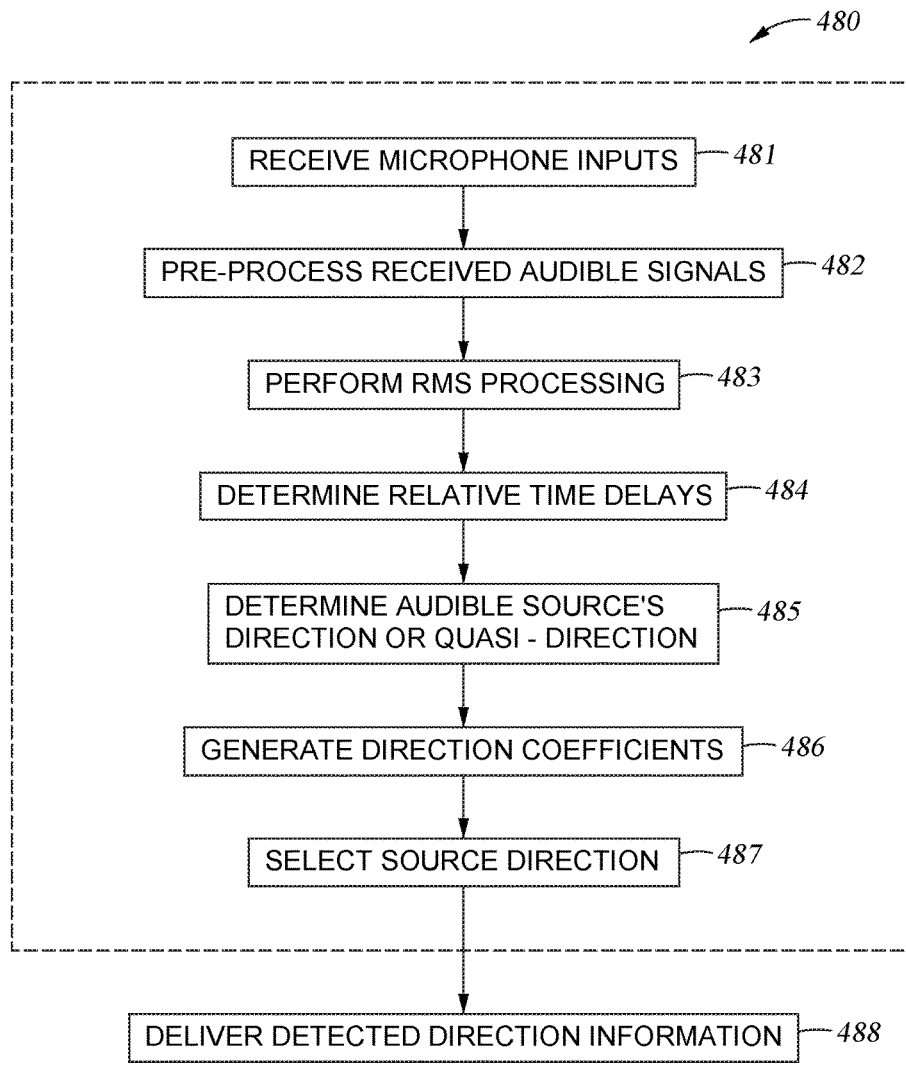
FIG. 4E illustrates a method of determining a desired direction from which an audible signal is received, according to one embodiment of the present disclosure.

Referring to FIGS. 4A and 4C, during the operation of the audible signal processing device 100 the direction detection element 430 is configured to determine and provide detected direction information to the first signal processor 405 and the second signal processor 407. FIG. 4E illustrates a method 480 of performing a direction detection technique using the direction detection element 430. The direction detection element 430 generally includes or uses portions of the controlling software program and various analog and digital hardware components to perform one or more of the processes described herein. In some embodiments, the direction detection element 430 includes elements that are formed within a digital signal processor (DSP) module. In some embodiments, the direction detection element 430 includes an equalizing element 460, an RMS processing element 467, a delay analysis element 462, a direction determination element 463, a coefficient generation element 464, a direction selection element 465, and a direction delivery element 466.

During operation, at step 482, after receiving the microphone inputs from the optional microphone gain element 420 during step 481, each of the audible signals provided from each of the microphones 101A-101C are preprocessed. The preprocessing steps may include processing the audible signal using an equalizing element 460 so that a certain desired frequency range, which may be associated with the speech range, can be extracted or isolated from other unwanted frequency regions before it is processed by the subsequent direction detection elements. In some configurations, the equalizing element 460 may include parametric equalizers 461A-461O that are each configured to process the audible signal received from each of the microphones 101A-101C, respectively. In some embodiments, the equalizing element 460 is configured to preferentially allow frequencies within the full speech range to pass therethrough and be delivered to one or more downstream components.

Next, at step 483, at least one of the inputs from a microphone within the geometrical array of microphones is then delivered to the root-mean-square (RMS) processing element 467 that is used to detect and in some cases remove constant audible noise signals 311 found within the composite audible signals 301 that are received by each of the microphones. The RMS processing element 467 may utilize an RMS threshold analysis element 468 that contains and/or monitors and stores information regarding the level of the constant audible noise signal 311 over time. The RMS processing element 467 may be configured to detect the current level of the received constant audible noise signal 311, and further receive input regarding historic constant audible noise signal levels from the RMS threshold analysis element 468, so that unwanted background noise does not get utilized in the direction detection algorithm and thus affect the direction detection element's results. In some embodiments, the RMS threshold analysis element 468 uses the measured level of the constant audible noise and compares it to a received audible signal to determine if the incoming audible data should be used towards the determination of its arrival direction, and thus the received audible data is not part of the noise within the environment 110 (FIG. 1A). The RMS processing element 467 can thus be used to reduce the risk of background music or crowd noise from affecting the direction analysis that is utilized by the first and second signal processing techniques.

Next, at step 484, the delay analysis element 462 receives the audible signals processed by the equalizing element 460 and analyzes the audible signals to determine the relative delays in the receipt of the audible signal experienced by each of the microphones. In some embodiments, the delay analysis element 462 analyzes each of the received audible signals as a function of time to determine which attributes in each of the received audible signals are common in each of the received audible signals to determine the relative delay experienced by each microphone. In one configuration, as illustrated in FIG. 2B, the delay analysis element 462 may detect a change in the sound level or signal pattern as a function of time to determine the delay experienced by each of the microphones. In one example, the controlling software program(s) may use a cross-correlation technique to determine the delay in the receipt of the audible signal experienced by each microphone, even though the received audible signal may be part of a composite audible signal that is received by the microphones. In another example, referring back to FIG. 3A, the controlling software program(s)

may compare the received composite audible signals 301 from the microphones within geometric array with the set audible signal level 321 to determine if at least a portion of the received composite audible signal 301 exceeds the audible signal level 321 for at least one of the microphones, and thus a desired audible signal that has been received from a user at one or more instants in time is singled out based on its higher signal level (e.g., dB level), and in some cases additionally using a cross-correlation technique.

In some cases, to reduce device power consumption and/or reduce the number of tasks performed by the processor, it may be desirable to only utilize the cross-correlation technique when the sound level of the received composite audible signal 301 exceeds the audible signal level 321. One will note that the microphone that is closest to the audible signal source will contain a zero time delay and the other microphones will contain a time delay that is related to the distance of the microphone from the closest microphone in the direction that the audible signal is received from the audible source. In some cases, the controlling software program will assure that the delay times are all positive and store the relative delays in the electronic device's memory.

At step 485, after determining the relative delay of each of the microphones, the direction determination element 463 then determines the direction that the audible signal is being received from by use of one or more portions of the controlling software program. While it is possible to perform various complicated mathematical analysis techniques to determine the exact position of the audible source relative to the electronic device 102, it has been found that these highly analytical direction detection processes require a significant amount of computing power and time, and thus can create a significant drain on the power source 130. The incorporation of these types of highly analytical direction detection processes would greatly increase the cost and complexity of a consumer electronic device that is able to perform these types of direction detection processes.

Therefore, in some embodiments, the direction determination element 463 utilizes a less analytically intensive and power intensive statistical binning approach to determine the direction of the audible source. While the direction determination element 463 in some cases will be able to detect the exact direction of the audible source from the electronic device 102, in most cases the direction that is determined by the direction determination element 463 will have an error, which at its maximum is related to the sample rate of the analysis program, spacing of the microphones and also the size of the direction bins selected and used by the controlling software program(s) to determine the nearest direction to the audible source direction. Thus, an audible signal direction determined by the statistical analysis that is performed by the direction determination element 463 is described herein as a "quasi-direction."

Figure 5B:
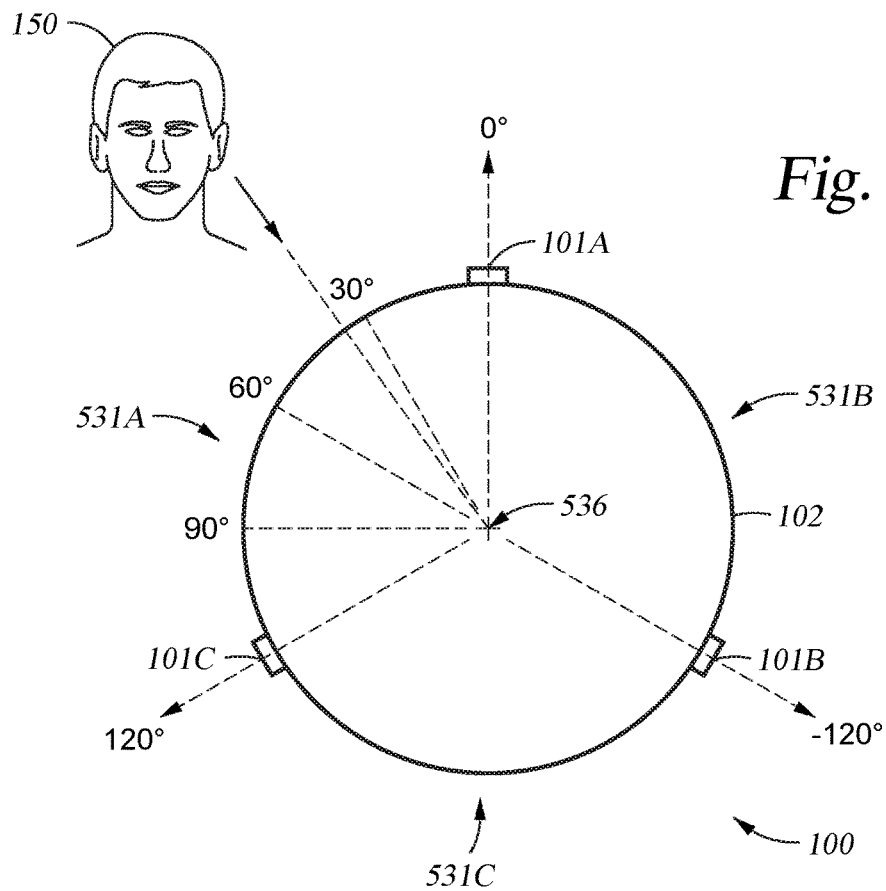
FIG. 5B is a plan view of the audible signal processing system illustrated in FIG. 5A that further includes a plurality of direction detection bins that may be used to determine the direction of an audible source, according to an embodiment of the disclosure provided herein.

During the direction determination process the direction determination element 463 uses the relative delay times received from the delay analysis element 462 to determine the direction of the received audible signal. The controlling software program and the direction determination element 463 may break-up the pattern of the geometrical array of microphones into binned regions. The number of binned regions will typically relate to the number of microphones that are contained within the geometrical array of microphones as well as the minimum width of the beam. In one example, the electronic device 102 illustrated in FIG. 1B could be divided up into five sectors or five angular regions. FIG. 5B is a plan view of the audible signal processing system 100 illustrated in FIG. 5A that further includes a plurality of direction detection regions that may be used to determine the direction of an audible source. In one example, the electronic device 102 can be broken up into three sectors 531A, 531B and 531C, which each include an angular region that has a 120° angular distance as measured from a vertex 536. In one configuration, the vertex 536 is positioned at the geometric center of the geometrical array of microphones. However, the vertex 536 may be positioned in other desired geometric locations relative to the geometric array of microphones to simplify the analysis performed by the controlling software program. Next, the direction determination element 463 then determines which region of the geometrical array of microphones the audible source is positioned nearest to currently. In one example, if the audible source is positioned at an angle of about 35° relative to the electronic device 102 illustrated in FIG. 5B, the direction determination element 463 will be able to first determine that the audible source is positioned within sector 531A, which extends between 0° and 120°, since the delay analysis element 462 will have determined that microphone 101A is the closest microphone to the audible source, and microphone 101C has a smaller time delay than microphone 101B due to their relative positions to the audible source.

Having determined the region of the geometrical array of microphones that the audible source is positioned nearest, the direction determination element 463 will then determine which directional bin (or binned region) within the determined region the audible source's direction is closest to so that a nearest quasi-direction can be determined. The directional bins are formed by dividing the angular region or sector into a desired number of sub-regions that meet desired accuracy and computing power goals. For example, each of the sectors 531A, 531B and 531C may be divided up into four binned regions that are each separated by a 30° interval. In one example, the first sector 531A's four bin configuration can be divided so that the edges of each of the bins have a known quasi-direction, such as directions 0°, 30°, 60°, 90° and 120° being the edges between the four formed bins. Thus, the angular distance formed for each defined bin (e.g., 30° bin) is disposed between a first known direction and a second known direction. In one example, the first direction is equal to the 0° direction and the second direction is equal to the 30° direction, wherein the first direction extends from the vertex point 536 through a portion of a first microphone 101A (e.g., geometric center of the microphone) and the second direction extends from the vertex point 536 in the 30° direction.

In one embodiment, to determine which of the quasi-directions the audible source's direction is closest to, the direction determination element 463 first calculates ratios of various time delays (e.g., first non-zero delay/second non-zero delay) measured by the delay analysis element 462 and then compares these calculated ratios with angular time delay ratio data that is stored within the memory unit 122. The stored angular time delay ratio data will include previously calculated data that is formed by calculating a ratio of the expected delays times that the microphones would see if the audible source was positioned at the edges of the bins that surround each of the quasi directions within a determined region of the electronic device 102. Therefore, using the example above, if the audible source is positioned at an angle of about 35° relative to the electronic device 102, the direction determination element 463 will determine, based on a calculated ratio of the delay time experienced by the microphone 101C to the delay time experienced by the microphone 101B, that the calculated ratio is closer to a stored angular time delay ratio associated with the 30° quasi-direction than any of the other stored angular time delay ratios associated with the other quasi-directions 0°, 60°, 90° or 120°. Alternately, the direction determination element 463 may determine that the calculated ratio is closer to a stored angular time delay ratio associated with the 30° quasi-direction by determining that the calculated ratio falls within a range that is half the bin size on either side of the quasi-direction. In this example, the direction determination element 463 may compare the calculated ratio with the stored angular time delay ratio associated with the directions 15°, 45°, 75° and 105°, and then determine that the calculated ratio falls between the stored angular time delay ratios that coincide with 15° and 45°. Therefore, the audible source is most likely positioned at the 30° quasi-direction.

In the somewhat rare case that the direction determination element 463 finds that the calculated ratio exactly matches a stored angular time delay ratio the controlling software program need not continue on with the process of determining that the calculated ratio falls between the stored angular time delay ratios.

One will appreciate that the process of determining the direction of the audible source is thus greatly simplified versus the mathematically intensive iterative process of determining the exact position of the audible source using a more conventional analytically intensive and power intensive approach. The greatly simplified statistical approach of determining the source direction will also reduce the performance requirements that the processor 118 needs to possess to perform these tasks.

In some embodiments, the direction determination element 463 will determine a direction of a received audible signal by first determining the relative time delays experienced by each microphone, and then comparing each of the relative time delays with a plurality of stored angular time delays. Each of the plurality of stored angular time delays, which are stored within memory, can be associated with a direction that is oriented relative to the non-linear array of microphones. Thus, for example, a stored angular time delay for each microphone can be associated for each quasi-direction, such as quasi-directions 0°, 30°, 60°, 90° or 120°. However, it is believed that the use of the ratio of the expected delay times in certain geometrical array configurations can be advantageous. For example, use of the ratio when the audible source may be positioned in 3-D space at an angle relative to a plane that contains a planar array of microphones can be useful due to the inherent comparison of the relative delays between microphones provided by the ratio versus other techniques that only compare delay times with the stored angular delay times.

However, since the accuracy of the time delay measurements determined by the delay analysis element 462 is also limited by the number of samples that can be collected by the processor 118 within the actual time delay experienced between microphones, some uncertainty in the determined time delay values will exist. The accuracy of the time delay is thus limited by the sampling frequency and spacing between microphones. The spacing of the microphones and the sampling frequency thus need to be large enough to allow at least two samples to be taken within time that the receipt of the audible signal is delayed without upsampling. One will note that the process of upsampling can be a significant drain on the processor resources and also the electrical power required to perform this task. For example, if the processor is sampling at a frequency of 48 kHz (e.g., 21 µs per sample) and the microphones are spaced 70 mm apart will allow 10 samples to be taken by the processor within the delay time, while a microphone spacing of 14 mm would only allow the processor to take 2 samples within the delay time. The uncertainty in the determined time delay values due to the often small number of samples and noise contained within the received audible signals can cause jitter between the determined source position states, which will affect the ability of the direction determination element 463 to determine and settle on one probable quasi-direction. Oscillating between the determined source position states at a high rate may affect the signal processing technique's ability to perform its desired function.

In some embodiments of step 485, the controlling software program analyzes the frequencies at which the various determined directions are selected by the direction determination element 463 to determine the most probable determined direction of the audible source. In one example, the controlling software program will compare the number of times various determined directions are selected by the direction determination element 463 over a period of time and then select the direction that has the highest frequency over that period of time as the determined direction. Determining the most probable determined direction can be performed in a rolling average type of process where each determined direction within the rolling period can be taken as a "vote" that are summed to determine which direction gets the most votes over the current rolling period. The frequency that each particular determined direction is determined may include the analysis of two or more audio data samples that are sampled by the processor at the data sampling frequency (e.g., 48 kHz sampling frequency). This process can diminish the amount of jitter experienced from the output of the direction determination element 463.

Figure 5C:
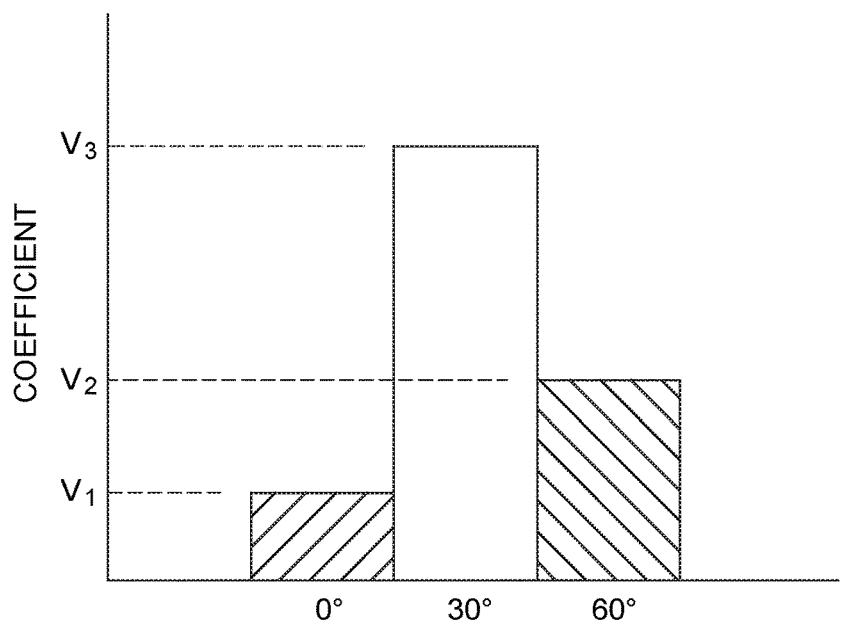
FIG. 5C is a graph that illustrates weighting coefficients that can be used to determine the direction of an audible source, according to one embodiment of the present disclosure.

Referring to FIG. 4E and step 486, in an effort to minimize the uncertainty in the determined quasi-direction received from direction determination element 463, the coefficient generation element 464 is used to apply various weights to a number of the directions that are close to the determined quasi-direction found during prior steps. FIG. 5C graphically illustrates some of the coefficient values that may be used in our example above to weight the determination that an audible source, which is oriented at a 35° angle to the electronic device, has a quasi-direction that is 30°. In this example, the quasi-direction of 30° may receive a coefficient value of $V_1$ and the adjacent quasi-directions of 0° and 60° may each receive a coefficient value of $V_2$ and $V_3$, respectively, which coincide with the probability that the actual direction determined over a few audible signal data samples is along each of the quasi-directions. The coefficient values $V_1$, $V_2$ and $V_3$ can be set at some value that is a percentage of full scale, and thus may, for example, have a value that includes real numbers between zero and one. The coefficient values may be determined based on how close the determined quasi-direction is to a stored angular time delay ratio and/or by forming a rolling average taken over a number of samples.

Next, at step 487, the direction selection element 465 then uses the determined coefficient values to determine the probable quasi-direction. The determined coefficient values are used to weight and thus damp the jitter experienced from the output of the direction determination element 463 as it determines and then refines the determined quasi-directions every received audible signal data sample or couple of audible signal data samples. In some embodiments, the determined coefficient values for each of the probable directions are summed over the sampling period or delay period, and the quasi-direction that has the highest sum total over the period is selected as the probable quasi-direction. In some configurations it may also be useful to give all of the coefficients associated with non-likely directions a zero or negative coefficient value to decrease the likelihood that these directions will be selected in this step.

At step 488, the direction delivery element 466 then delivers the detected direction information, which contains the determined direction or quasi-direction, to the first signal processor 405 and the second signal processor 407. The detected direction information is then received by the first signal processor 405 and the second signal processor 407, during steps 472 and 491, respectively, for further use or processing.

Second Signal Processor Example

Figure 4F:
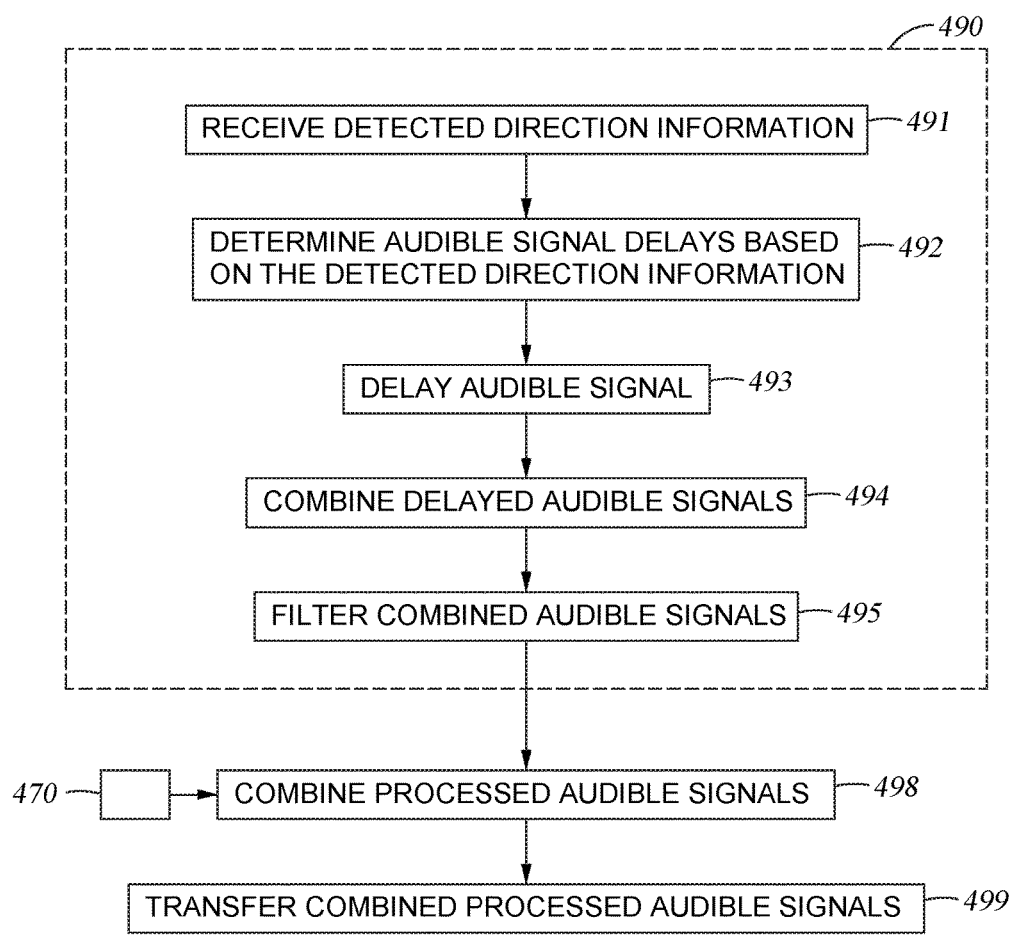
FIG. 4F illustrates a method of performing a second type of signal processing technique, according to one embodiment of the present disclosure.

Referring to FIGS. 4A and 4B, the second signal processor 407 is generally adapted to separate a desired audible signal from any unwanted noise that may be found within the higher end of the audible signal frequency range by processing the audible signals received from the geometrical array of microphones using a beamforming noise rejection technique. FIG. 4F illustrates a method 490 of performing the beamforming noise rejection technique, or second signal processing technique, using the second signal processor 407. The second signal processor 407 includes or uses portions of the controlling software program and various analog and digital hardware components to perform the desired processes described herein. In some embodiments, the second signal processor 407 includes elements that are formed within a digital signal processor (DSP) module. The beamforming processing technique performed by the second signal processor 407 generally separates the noise received from an off axis direction using an audible signal delay and summing technique using the audible inputs received from the geometrical array of microphones. In some embodiments, the beamforming process is achieved by determining a delay for each microphone based on the direction or quasi-direction determined by the direction detection element 430 and then summing the delayed audible signals received by each of the microphones within the geometrical array of microphones so that the audible signal received by the microphones from the audible source are all in phase and thus constructively add when combined.

In some embodiments, the second signal processor 407 uses the received direction or quasi-direction information for a first period of time that is longer than the time it takes the direction detection element 430 to update the direction or quasi-direction information (e.g., a second time). In this case, the rate at which the time delays are updated during the beamforming process is less than the rate at which the direction detection element 430 is able to update the direction or quasi-direction information, which will reduce a significant amount computing power, battery power and time expended by the electronic device 102. Use of this process can be helpful to smooth the final processed audible signal, which is generally not achieved if the rate the direction is updated is too rapid.

Figure 7A:
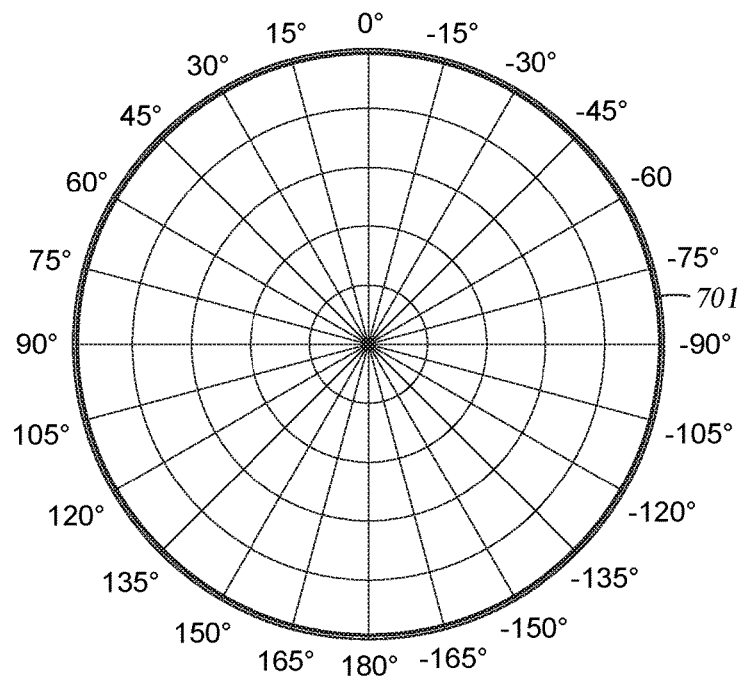
FIGS. 7A-7C illustrate examples of beamforming patterns that are formed at different frequencies by use of a second signal processing technique, according to an embodiment of the disclosure provided herein.
Figure 7B:
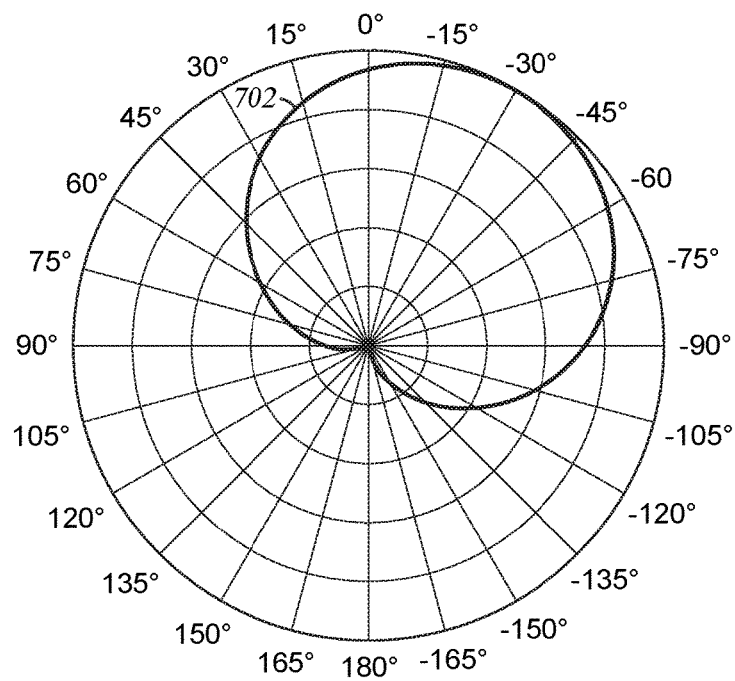
Figure 7C:
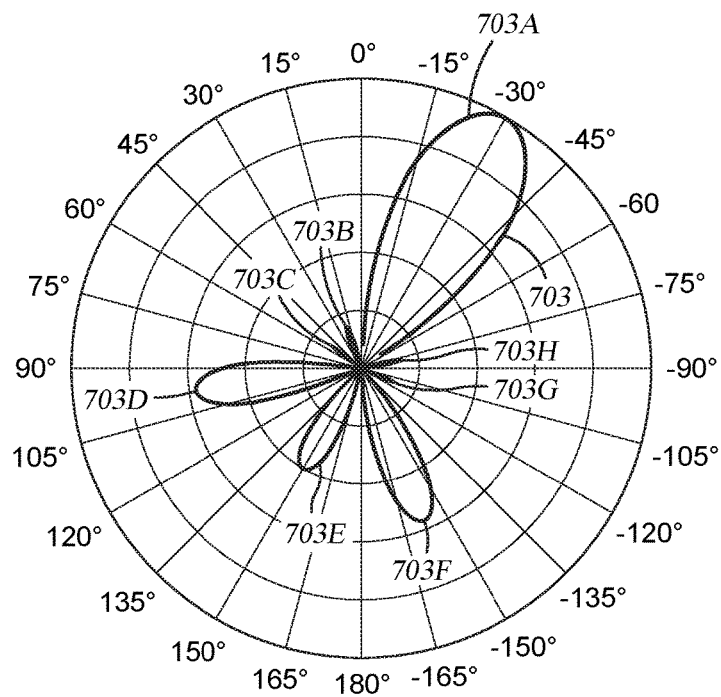

FIG. 7A illustrates an example of a first beamforming pattern 701 that is formed by the second signal processing technique using the plurality of microphones that are a fixed distance apart (e.g., 70 mm) at a first frequency of about 100 Hz. One will note that a desired audible source is positioned at the −30° position relative to the orientation of the polar graph. However, the beamforming technique at this low frequency has no ability to separate off-axis noise from the desired audible source, as shown by the circular shape of the beamforming pattern. FIG. 7B illustrates an example of a second beamforming pattern 702 that is formed by the second signal processing technique at a second frequency of about 1300 Hz using the same microphones used to form the first beamforming pattern 701. In this example, the second beam forming pattern 702, which is formed at a frequency of 1300 Hz, has a near cardioid shape that is pointing in the direction of the desired audible source (e.g., −30°). FIG. 7C illustrates an example of a third beamforming pattern 703 that is formed at a third frequency of about 5000 Hz by the same microphones used to form the first beamforming pattern 701. In this example, the third beam forming pattern 703 has also become distorted due to the effect of frequency on the detected signal such that it contains eight lobes 703A-703H. The ability of the second signal processing technique to reject off-axis noise sources in all but three of the eight off-axis directions (e.g., lobes 703D-703F) at this frequency will be substantial, while the lobe 703A which is oriented in the audible sources direction will accept most if not all of the audible signal received from a desired audible source that is positioned at the −30° position. As noted above, in some embodiments, the relative spacing between the various microphones may be adjusted in the audible signal processing system 100 so that the frequency range that the second signal processing technique can operate within can be desirably set. For example, the lower end of the frequency range, in which the second signal processing technique is able to adequately reject off-axis noise, may be selected such that it is between about 1,000 Hz and about 4,000 Hz, while at the upper end of the frequency range, such as about 4000-8000 Hz, the second signal processing technique is able to form a dominant lobe (e.g., lobe 703A) in the audible source's direction as similarly illustrated in FIG. 7C.

Referring back to FIGS. 4A and 4B, the second signal processor 407 generally includes beamformer signal delaying elements 431A-4310, a signal combining element 432 and a signal filtering element 408, parametric equalizer 409, and a mix gain amplifier 410 disposed within the post processing element 451. Referring back to FIG. 4F, during operation, the second signal processor 407 first receives detected direction information from the direction detection element 430 (e.g., step 491) that is based on audible signals received by the geometrical array of microphones. The detected direction information then allows the beamforming process to be aimed in the desired direction effectively reducing the amount of off-axis noise in the audible signals received after passing through the various components within the direction detection device 430, as described above. The beamforming process is generally performed by use of the audible signals received by all of the microphones and the detected direction information received from the direction detection element 430.

At steps 492-493, in some embodiments, the controlling software program performs an analysis of the received detected direction information received from the direction detection element 430 and then determines based on the detected direction or quasi-direction what the desired delay needs to be for each of the audible signals received by each of the microphones based on specific directional time delay information stored within the memory unit 122. The directional time delay information stored within the memory unit 122 may include a table of all of the possible directions or quasi-directions that the direction detection element 430 will provide to the second signal processing technique and all of the time delay values that are associated with each of the possible directions or quasi-directions for each of the microphones. Thus, the table will contain a time delay value for each microphone for each of the possible directions or quasi-directions. In one example, as shown in FIG. 5A, the plurality of directions can include all directions, which at least have a component of the actual direction, within a plane parallel to the top surface 106 (FIG. 1) from all different angles (e.g., 0° to 360°). The time delay used by the signal delaying elements 431A-431C is set by the known distance between the microphones in the direction that the audible signal is received and the known speed of sound.

Next, at step 494, the delayed audible signals are then combined together by use of the signal combining element 432. Then, at step 495, the delayed audible signals are then optionally filtered by use of the signal filtering element 408 within the post processing element 451. The signal filtering element may include a high pass filter that is able to remove frequencies that are lower than the useable range of the second signal processor 407. For example, high pass filter frequency may be configured to allow frequencies higher than about 1,000 Hz to pass. The appropriately delayed and combined audible signals will constructively add, and thus improve the signal-to-noise ratio of the audible source's audible input versus the off-axis noise delivered from unwanted noise sources.

As noted above, after the first and second signal processing processes have been completed the processed audible signal output from the first signal processor 405 may be further processed by use of a post processing elements 452 (step 477) and the processed audible signal output from the second signal processor 407 may be further processed by use of a post processing elements 451 (step 495) before they are combined together by the signal combining element 414 at step 498. The post processing elements 451, 452 may each include one or more amplifiers that are able to adjust the signal levels of the processed audible signals before they are combined.

Figure 8A:
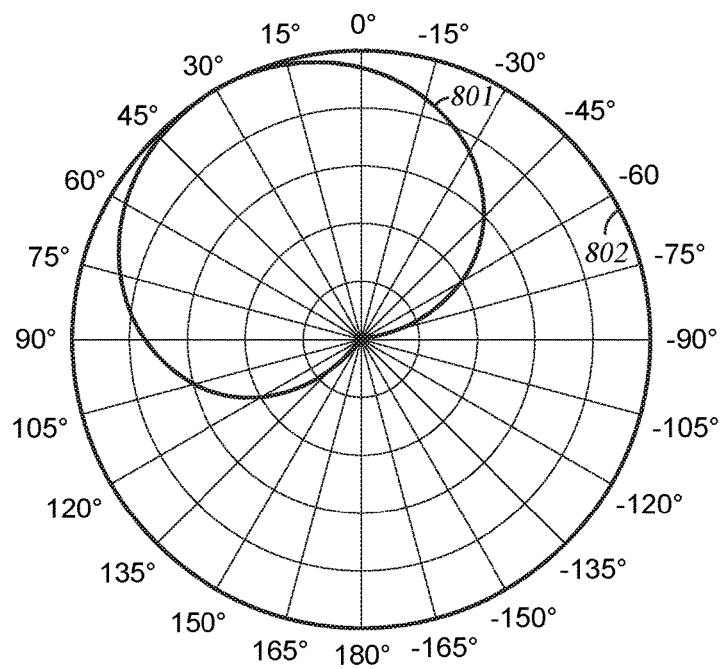
FIGS. 8A-8C illustrate examples of patterns that are formed at different frequencies by use of a first signal processing technique and a second signal processing technique, according to an embodiment of the disclosure provided herein.
Figure 8B:
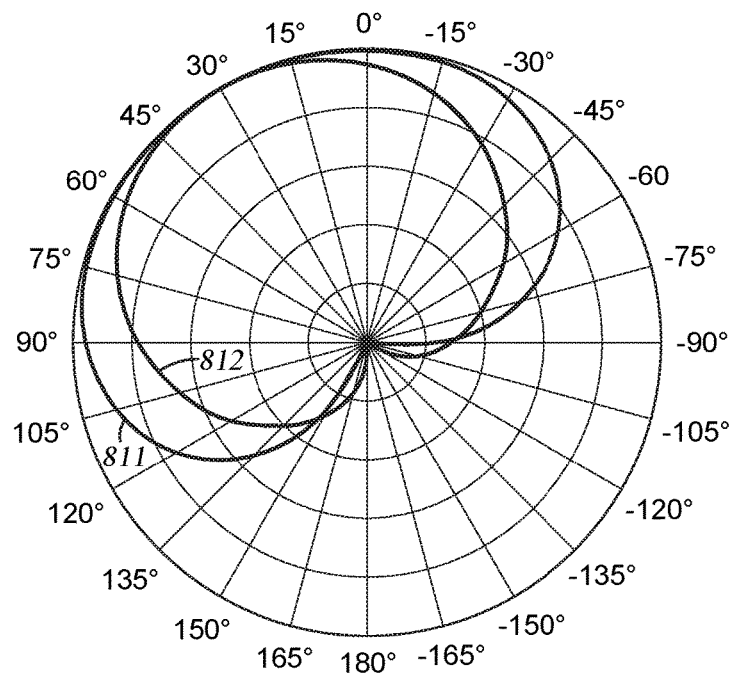
Figure 8C:
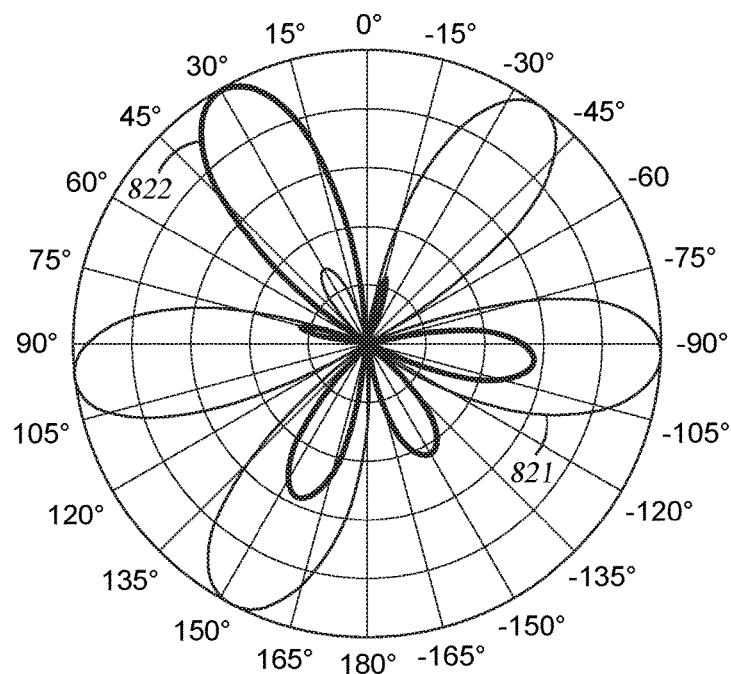

FIGS. 8A-8C illustrate examples of various patterns that are formed at different frequencies by use of a first signal processing technique and a second signal processing technique. The first and second signal processing techniques used to form the patterns found in FIGS. 8A-8C employ a geometrical microphone array that contains three microphones that are a fixed 70 mm distance apart. FIG. 8A illustrates an example of a pattern 801 that is formed by the first signal processing technique using a first-order cardioid based signal processing technique and a pattern 802 that is formed by the second signal processing technique at a first frequency of about 100 Hz. One will note that the desired audible source is positioned at a 30° position relative to the orientation of the polar graph, such that the maximum amount of the audible signal at this frequency is accepted by the first signal processing technique while the second signal processing technique is ineffective at rejecting all audible signals at this frequency in all directions. Therefore, the noise rejection provided by the first signal processing technique can be preferentially used to "clean up" the audible signal at the low end frequencies.

FIG. 8B illustrates an example of a pattern 811 that is formed by the first signal processing technique using a first-order cardioid based signal processing technique and a pattern 812 that is formed by the second signal processing technique at a second frequency of about 1600 Hz. One will note that by changing the frequency from 100 Hz to about 1600 Hz the ability of the second signal processing technique to reject off-axis noise sources has improved, and as shown in FIG. 8B is similar to the cardioid pattern created by the first signal processing technique at this frequency. Since the noise rejection results received by both of the signal processing techniques are similar at 1600 Hz, a frequency at or near 1600 Hz can be selected and used by the controlling software as a transition point in the frequency range where the results received from first signal processing technique will be used at frequencies below the transition point and the results received from second signal processing technique will be used at frequencies above the transition point. In some embodiments, it is desirable to select the high pass and low pass filters used within the audible signal processing device 400 so that the upper end of the frequency range of the first signal processing technique is set to a point that is at or at least close to this transition frequency and the lower end of the frequency range of the second signal processing technique is set to a point that is at least close to this transition frequency.

FIG. 8C illustrates an example of a pattern 821 that is formed by the first signal processing technique using a first-order cardioid based signal processing technique and a pattern 822 that is formed by the second signal processing technique at a third frequency of about 6500 Hz. One will note that the desired audible source is positioned at the 30° position relative to the orientation of the polar graph, such that the maximum amount of the audible signal at this frequency is accepted by the second signal processing technique (i.e., pattern 822) while nearly all of audible signal at this frequency is rejected in audible source's directions by the first signal processing technique and the off-axis side-lobe directions (e.g., angles −38°, −95°, 98° and 155°) are actually favored over the audible source's direction. Therefore, the noise rejection provided by the second signal processing technique can be preferentially used to "clean up" the audible signal at the high end frequencies.

At step 499, the signal combining element 414 then provides the processed audible signal (e.g., desired audible signal) to a downstream element 415. As noted above, the downstream element 415 may include a software application or other electronic device that uses the processed audible signal to perform some desired activity.

One or more of the embodiments of the disclosure provided herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method of processing an audible signal received from an external audible source, comprising:

separating a first portion of an audible signal generated from a second audible source from a composite audible signal to form a first combined audible signal using a non-linear array of microphones and a first signal processing technique, wherein the composite audible signal includes the audible signal generated from the second audible source and the audible signal received from the external audible source, and the first signal processing technique uses at least two of the microphones in the non-linear array to remove the first portion of the audible signal;

improving a signal-to-noise ratio of the audible signal received from the external audible source relative to a second portion of the audible signal generated from the second audible source using a second signal processing technique, wherein the second signal processing technique improves the signal-to-noise ratio by use of a process comprising:

delaying the composite audible signal received by at least two of the microphones within the non-linear array of microphones to produce a delayed audible signal for each of the at least two of the microphones based on direction information that is derived from an audible signal provided from the external audible source and received by the non-linear array of microphones; and combining the delayed audible signals from the at least two microphones to produce a second combined audible signal; and combining the first combined audible signal and the second combined audible signal to produce a fourth combined audible signal that is adapted for use in an audible signal processing activity.

2. The method of claim 1, wherein the first portion and the second portion of the audible signal generated from the second audible source are disposed within different ranges of frequencies.

3. The method of claim 1, wherein the audible signal processing activity includes voice recognition, voice detection, voice activated electronic device control or a voice communication process.

4. The method of claim 1, wherein the non-linear array of microphones comprises a first microphone, a second microphone and a third microphone.

5. The method of claim 4, wherein delaying the composite audible signal received by at least two of the microphones within the non-linear array of microphones further comprises:

delaying the composite audible signal received by the first microphone and the second microphone each a different period of time relative to a time when the composite audible signal are received by the third microphone.

6. The method of claim 4, wherein the direction information is determined by:

determining when the audible signal from the external audible source was provided to the first microphone, the second microphone and the third microphone;

determining a first relative time delay, wherein the first relative time delay is calculated by subtracting the time when the first microphone received the audible signal from the time when the second microphone received the audible signal;

determining a second relative time delay, wherein the second relative time delay is calculated by subtracting the time when the first microphone received the audible signal from the time when the third microphone received the audible signal;

comparing the first relative time delay and the second relative time delay with a plurality of stored time delays, wherein each of the plurality of stored time delays are associated with a direction that is oriented relative to the non-linear array of microphones; and determining that the audible signal was received from a first direction based on the comparison of the first relative time delay and the second relative time delay with a plurality of stored time delays, wherein the distance between the first microphone and the external audible source is less than the distance between the external audible source and the second microphone or the third microphone.

7. The method of claim 1, further comprising:

filtering the first combined audible signal before combining the first combined audible signal and the second combined audible signal, wherein filtering the first combined signal comprises removing all frequencies greater than a first frequency from the first combined audible signal; and filtering the second combined audible signal before combining the first combined audible signal and the second combined audible signal, wherein filtering the second combined signal comprises removing all frequencies less than a second frequency from the second combined audible signal.

8. The method of claim 1, wherein the non-linear array of microphones comprises a first microphone, a second microphone and a third microphone, and the first signal processing technique comprises:

delaying a portion of the composite audible signal received by the third microphone a predetermined delay time;

inverting the delayed composite audible signal to form a first inverted audible signal;

combining the first inverted audible signal and the composite audible signal received by the first microphone to form a third combined audible signal;

delaying a portion of the composite audible signal received by the first microphone a predetermined delay time;

inverting the delayed composite audible signal to form a second inverted audible signal;

combining the second inverted audible signal and the composite audible signal received by the third microphone to form a fourth combined audible signal;

delaying a portion of the third combined audible signal a predetermined delay time;

inverting the delayed third combined audible signal to form a third inverted audible signal;

combining the third inverted audible signal and the fourth combined audible signal to form the fifth combined audible signal; and providing a fifth combined audible signal to a software application and/or electronic device that is configured to perform an audible signal processing activity based on the receipt of the fifth combined audible signal.

9. The method of claim 8, wherein the audible signal processing activity includes voice recognition, voice detection, voice activated electronic device control or a voice communication process.

10. The method of claim 8, wherein delaying the composite audible signal received by at least two of the microphones within the non-linear array of microphones within the second signal processing technique further comprises:

delaying the composite audible signal received by the first microphone and the second microphone each a different period of time relative to a time when the composite audible signal are received by the third microphone.

11. The method of claim 8, wherein the direction information is determined by:
  determining when the audible signal from the external audible source was provided to the first microphone, the second microphone and the third microphone;
  determining a first relative time delay, wherein the first relative time delay is calculated by subtracting the time when the first microphone received the audible signal from the time when the second microphone received the audible signal;
  determining a second relative time delay, wherein the second relative time delay is calculated by subtracting the time when the first microphone received the audible signal from the time when the third microphone received the audible signal;
  comparing the first relative time delay and the second relative time delay with a plurality of stored time delays, wherein each of the plurality of stored time delays are associated with a direction that is oriented relative to the non-linear array of microphones; and
  determining that the audible signal was received from a first direction based on the comparison of the first relative time delay and the second relative time delay with a plurality of stored time delays,
  wherein the distance between the first microphone and the external audible source is less than the distance between the external audible source and the second microphone or the third microphone.

12. The method of claim 8, further comprising:
  filtering the first combined audible signal before combining the first combined audible signal and the second combined audible signal, wherein filtering the first combined signal comprises removing all frequencies greater than a first frequency from the first combined audible signal; and
  filtering the second combined audible signal before combining the first combined audible signal and the second combined audible signal, wherein filtering the second combined signal comprises removing all frequencies less than a second frequency from the second combined audible signal.

13. A method of processing an audible signal received from an external audible source, comprising:
  determining a direction from which a first audible signal is provided to a non-linear array of microphones, wherein the first audible signal is provided from the external audible source;
  separating a first portion of an audible signal generated from a second audible source from a composite audible signal, which is received by the non-linear array of microphones, using a first signal processing technique, wherein the composite audible signal includes the audible signal generated from the second audible source and a second audible signal received from the external audible source, and the first signal processing technique removes the first portion of the audible signal generated from the second audible source by use of a process comprising:
    selecting a first microphone and a second microphone within the non-linear array of microphones based on the determined direction received from the direction detection element;
    delaying the composite audible signal received by the second microphone from the external audible source a first period of time to produce a first delayed audible signal;
    inverting the first delayed audible signal to produce an inverted audible signal that is based on the delayed composite audible signal; and
    combining the inverted audible signal and the composite audible signal received by the first microphone to produce a first combined audible signal, wherein the composite audible signal received by the second microphone includes the first portion of the audible sound generated from the second audible source; and
  improving a signal-to-noise ratio of the audible signal received from the external audible source relative to a second portion of the audible signal generated from the second audible source using a second signal processing technique, wherein the second signal processing technique improves the signal-to-noise ratio by:
    delaying the composite audible signal received by at least two of the microphones within the non-linear array of microphones to produce a delayed audible signal for each of the at least two of the microphones based on the determined direction received from the direction detection element; and
    combining the delayed audible signals from the at least two microphones to produce a second combined audible signal; and
  combining the first combined audible signal and the second combined audible signal to produce a fourth combined audible signal that is adapted for use in an audible signal processing activity.

14. The method of claim 13, wherein the first portion of the audible signal generated from the second audible source comprises a range of frequencies of the audible signal that are less than a first frequency, and the second portion of the audible signal generated from the second audible source comprises a range of frequencies of the audible signal that are greater than the first frequency.

15. The method of claim 13, wherein the audible signal processing activity includes voice recognition, voice detection, voice activated electronic device control or a voice communication process.

16. The method of claim 13, wherein the delayed portion of the composite audible signal received by the first microphone comprises:
  a combined audible signal that is formed by combining at least a portion of the composite audible signal received by two of the microphones within the non-linear array of microphones.

17. The method of claim 13, wherein combining the composite audible signal received by two of the microphones comprises averaging the composite audible signal received by the two microphones within the non-linear array of microphones.

18. The method of claim 13, wherein the non-linear array of microphones comprises the first microphone, the second microphone and a third microphone.

19. The method of claim 18, wherein delaying the composite audible signal received by the at least two of the microphones within the non-linear array of microphones further comprises:
  delaying the composite audible signal received by the second microphone a first period of time and the third microphone a second period of time, wherein the first period of time and the second period of time are each determined relative to a time when the composite audible signal are received by the first microphone.

20. A method of processing an audible signal received from an external audible source, comprising:

determining a direction of an audible signal received by a plurality of microphones, which are disposed within a non-linear array of microphones, from an external audible source, wherein the determined direction is based on a comparison of when a first audible signal was received by each of the plurality of microphones;

processing the audible signal using a first signal processor, wherein processing the audible signal comprises:

selecting a first microphone and a second microphone within the non-linear array of microphones based on the determined direction received from a direction detection element;

delaying a composite audible signal received by the second microphone a predetermined delay time, wherein the composite audible signal includes a second audible signal generated from the external audible source;

inverting the delayed composite audible signal; and combining the inverted composite audible signal and the portion of the composite audible signal received by the first microphone to form a first combined audible signal;

processing the composite audible signal using a second signal processor, wherein processing the composite audible signal comprises:

delaying the portion of the composite audible signal received by each of the microphones in the non-linear array of microphones a desired delay time based on the determined direction; and combining each of the delayed audible signals to form a second combined audible signal; and combining the first combined audible signal and the second combined audible signal to form a fourth combined audible signal; and transmitting the fourth combined audible signal to an electronic component, wherein the electronic component is configured to perform an audible signal processing activity based on the receipt of the fourth combined audible signal.

21. The method of claim 20, wherein the activity performed by the electronic component includes voice recognition, voice detection, or voice communication.

22. The method of claim 20, wherein the electronic component comprises a wireless speaker, cell phone, tablet or personal computer.

23. The method of claim 20, wherein the first microphone comprises a virtual microphone that is formed by averaging an audible signal input received from a third microphone and a fourth microphone that are disposed within the non-linear array of microphones, wherein the audible signal input comprises the audible signal.

* * * * *